(12) United States Patent
Huang et al.

(10) Patent No.: US 11,777,653 B2
(45) Date of Patent: Oct. 3, 2023

(54) SEQUENCE DESIGN FOR NONCOHERENT TRANSMISSION WITH FREQUENCY AND TIMING ERRORS

(71) Applicant: QUALCOMM Incorporated, San Diego, CA (US)

(72) Inventors: Yi Huang, San Diego, CA (US); Wei Yang, San Diego, CA (US); Gokul Sridharan, Sunnyvale, CA (US); Peter Gaal, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 154 days.

(21) Appl. No.: 17/372,206

(22) Filed: Jul. 9, 2021

(65) Prior Publication Data
US 2022/0021484 A1   Jan. 20, 2022

Related U.S. Application Data

(60) Provisional application No. 63/051,875, filed on Jul. 14, 2020.

(51) Int. Cl.
*H04L 1/08*         (2006.01)
*H04W 72/044*       (2023.01)

(52) U.S. Cl.
CPC ............. *H04L 1/08* (2013.01); *H04W 72/044* (2013.01)

(58) Field of Classification Search
None
See application file for complete search history.

(56) References Cited

U.S. PATENT DOCUMENTS

| 10,177,941 | B2 * | 1/2019 | Oh ..................... H04L 25/022 |
| 2016/0142898 | A1 * | 5/2016 | Poitau ................ H04W 72/02 |
| | | | 370/329 |
| 2019/0029031 | A1 * | 1/2019 | Kumar ................ H04W 72/21 |
| 2019/0357194 | A1 * | 11/2019 | Hwang ............... H04L 5/0044 |
| 2020/0067748 | A1 * | 2/2020 | Zhang ................ H04W 16/28 |

(Continued)

FOREIGN PATENT DOCUMENTS

WO   WO-2020164639 A1 *   8/2020   ........... H04L 5/0051

OTHER PUBLICATIONS

ZTE (Email discussion to collect detailed description of the NOMA schemes) (3GPP TSG RAN WG1 Meeting #94) (Year: 2018).*

*Primary Examiner* — The Hy Nguyen
(74) *Attorney, Agent, or Firm* — Holland & Hart LLP

(57) ABSTRACT

Methods, systems, and devices for wireless communications are described. A first network device (e.g., a base station) may determine, based on one or more transmissions received over a channel and a channel condition of the channel, a configuration for repeating a sequence from multiple sequences over a resource allocation. A second network device (e.g., a UE) may transmit one or more transmissions over a channel to the first network device. The first network device may transmit, to the second network device, an indication of the configuration for repeating the sequence over the resource allocation. The second network device may transmit a first instance of the sequence and a second instance of the sequence based on the configuration. The first network device may perform error correction on the data based on the received first instance of the sequence and the received second instance of the sequence.

29 Claims, 18 Drawing Sheets

(56) References Cited

U.S. PATENT DOCUMENTS

| | | | | |
|---|---|---|---|---|
| 2020/0413413 A1* | 12/2020 | Haghighat | ............ | H04L 5/0094 |
| 2021/0152409 A1* | 5/2021 | Pan | .................... | H04W 74/0833 |
| 2022/0256566 A1* | 8/2022 | Gao | ...................... | H04L 1/1896 |

* cited by examiner

Column $n$ $$W = \frac{1}{\sqrt{N}} \begin{bmatrix} 1 & 1 & 1 & 1 & \cdots & 1 \\ 1 & \omega & \omega^2 & \omega^3 & \cdots & \omega^{N-1} \\ 1 & \omega^2 & \omega^4 & \omega^6 & \cdots & \omega^{2(N-1)} \\ 1 & \omega^3 & \omega^6 & \omega^9 & \cdots & \omega^{3(N-1)} \\ \vdots & \vdots & \vdots & \vdots & \ddots & \vdots \\ 1 & \omega^{N-1} & \omega^{2(N-1)} & \omega^{3(N-1)} & \cdots & \omega^{(N-1)(N-1)} \end{bmatrix}$$

Row $n$

— 300

$$S(m) = \begin{bmatrix} S(M-1)\, e^{j2\pi(M-1)m/M} \\ \vdots \\ S(l)\, e^{j2\pi l m/M} \\ \vdots \\ S(2)\, e^{j2\pi 2 m/M} \\ S(1)\, e^{j2\pi 1 m/M} \\ S(0)\, e^{j2\pi 0 m/M} \end{bmatrix}$$

Tone Index

← Tone Index $l$

— 305

FIG. 3

SEQUENCE DESIGN FOR NONCOHERENT TRANSMISSION WITH FREQUENCY AND TIMING ERRORS

CROSS REFERENCE

The present application for patent claims the benefit of U.S. Provisional Patent Application No. 63/051,875 by HUANG et al., entitled "SEQUENCE DESIGN FOR NONCOHERENT TRANSMISSION WITH FREQUENCY AND TIMING ERRORS," filed Jul. 14, 2020, assigned to the assignee hereof, and expressly incorporated by reference herein.

FIELD OF TECHNOLOGY

The following relates to wireless communications, including sequence design for noncoherent transmission with frequency and timing errors.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

In some wireless communications systems, a UE may transmit a signal to a base station and the signal may include information (e.g., a payload). In some cases, the UE may transmit the information (e.g., the payload) in a resource allocation according to a selected sequence, which a network device may select from a set of sequences. But timing errors or frequency errors, or both, may degrade sequence detection performance for sequence-based transmissions from one device (e.g., a UE) to another (e.g., a base station).

The described techniques relate to improved methods, systems, devices, and apparatuses that support sequence design for noncoherent transmission with frequency and timing errors. Generally, the described techniques provide for transmitting sequences in a way that minimizes reception and allows the receiving device to properly address timing errors, or frequency errors, or both. In some cases, a first network device (e.g., a base station or a UE) may determine, based at least in part on one or more transmissions received over a channel and a channel condition of the channel, a configuration for repeating a sequence from multiple sequences over a resource allocation, the multiple sequences configured for conveying data. In some cases, a second network device (e.g., a UE) may transmit one or more transmissions over a channel, for example, to the first network device (e.g., a base station). In some cases, the first network device may transmit, to the second network device, an indication of the configuration for repeating the sequence over the resource allocation and the second network device may implement the configuration. The second network device may transmit (and the first network device may receive), a first instance of the sequence and a second instance of the sequence based on the configuration. The first network device may perform error correction on the data based at least in part on the received first instance of the sequence and the received second instance of the sequence to properly address timing errors, or frequency errors, or both, among other advantages.

A method of wireless communications at UE is described. The method may include receiving, from the base station, an indication of a configuration that repeats a sequence from a set of sequences over a resource allocation, the set of sequences configured for conveying a data and transmitting, to the base station, at least a first instance of the sequence and a second instance of the sequence based on the configuration.

An apparatus for wireless communications at UE is described. The apparatus may include a processor, memory coupled with the processor, and instructions stored in the memory. The instructions may be executable by the processor to cause the apparatus to receive, from the base station, an indication of a configuration that repeats a sequence from a set of sequences over a resource allocation, the set of sequences configured for conveying a data and transmit, to the base station, at least a first instance of the sequence and a second instance of the sequence based on the configuration.

Another apparatus for wireless communications at UE is described. The apparatus may include means for receiving, from the base station, an indication of a configuration that repeats a sequence from a set of sequences over a resource allocation, the set of sequences configured for conveying a data and transmitting, to the base station, at least a first instance of the sequence and a second instance of the sequence based on the configuration.

A non-transitory computer-readable medium storing code for wireless communications at UE is described. The code may include instructions executable by a processor to receive, from the base station, an indication of a configuration that repeats a sequence from a set of sequences over a resource allocation, the set of sequences configured for conveying a data and transmit, to the base station, at least a first instance of the sequence and a second instance of the sequence based on the configuration.

In some examples of the method, apparatuses, and non-transitory computer-readable medium described herein, receiving the indication of the configuration may include operations, features, means, or instructions for receiving the indication of the configuration via a radio resource control message, or a media access control control element message, or a downlink control information, or any combination thereof.

Some examples of the method, apparatuses, and non-transitory computer-readable medium described herein may further include operations, features, means, or instructions for receiving, from the base station, an indication of a second configuration that repeats at least one sequence of the set of sequences over a second resource allocation, where transmitting the indication of the configuration and the indication of the second configuration includes transmitting via the radio resource control message, where the second configuration differs from the configuration.

Some examples of the method, apparatuses, and non-transitory computer-readable medium described herein may further include operations, features, means, or instructions for determining, based on the indication of the configuration, that the configuration includes repeating the sequence in a time domain, where transmitting at least the first instance of the sequence and the second instance of the sequence may be based on the repeating of the sequence in the time domain.

Some examples of the method, apparatuses, and non-transitory computer-readable medium described herein may further include operations, features, means, or instructions for determining the configuration to repeat the sequence in the time domain may be based on a Kronecker product associated with a discrete Fourier transform matrix of a size equal to half of a total number of orthogonal frequency division multiple symbols in the resource allocation and a cyclically shifted base sequence having a length corresponding to a number of frequency tones in the resource allocation.

In some examples of the method, apparatuses, and non-transitory computer-readable medium described herein, the first instance of the sequence may be spread over a first subset of orthogonal frequency division multiple symbols of the resource allocation and the second instance of the sequence may be spread over a second subset of orthogonal frequency division multiple symbols of the resource allocation.

Some examples of the method, apparatuses, and non-transitory computer-readable medium described herein may further include operations, features, means, or instructions for determining, based on the indication of the configuration, that the configuration includes repeating the sequence in a frequency domain, where transmitting at least the first instance of the sequence and the second instance of the sequence may be based on the repeating of the sequence in the frequency domain.

Some examples of the method, apparatuses, and non-transitory computer-readable medium described herein may further include operations, features, means, or instructions for determining the configuration to repeat the sequence in the frequency domain based on a Kronecker product associated with a discrete Fourier transform matrix having a size corresponding to a number of time periods in the resource allocation and a length of a cyclically shifted base sequence having a length equal to half of the number of frequency tones in the resource allocation.

In some examples of the method, apparatuses, and non-transitory computer-readable medium described herein, the first instance of the sequence may be spread over a first subset of frequency tones of the resource allocation and the second instance of the sequence may be spread over a second subset of frequency tones of the resource allocation.

Some examples of the method, apparatuses, and non-transitory computer-readable medium described herein may further include operations, features, means, or instructions for determining, based on the indication of the configuration, that the configuration includes repeating the sequence in a time domain and a frequency domain, where transmitting at least the first instance of the sequence and the second instance of the sequence may be based on the repeating of the sequence in the time domain and in the frequency domain.

In some examples of the method, apparatuses, and non-transitory computer-readable medium described herein, the first instance of the sequence may be spread over a first subset of orthogonal frequency division multiple symbols and frequency tones of the resource allocation, the second instance of the sequence may be spread over a second subset of orthogonal frequency division multiple symbols and frequency tones of the resource allocation, a third instance of the sequence may be spread over a third subset of orthogonal frequency division multiple symbols and frequency tones of the resource allocation, and a fourth instance of the sequence may be spread over a fourth subset of orthogonal frequency division multiple symbols and frequency tones of the resource allocation.

In some examples of the method, apparatuses, and non-transitory computer-readable medium described herein, the set of sequences includes orthogonal sequences when a size of the data does not satisfy a data threshold, and where the set of sequences includes non-orthogonal sequences when the size of the data satisfies the data threshold.

In some examples of the method, apparatuses, and non-transitory computer-readable medium described herein, a number of the set of sequences may be based on a number of time periods for conveying the data and a number of frequency tones for conveying the data.

In some examples of the method, apparatuses, and non-transitory computer-readable medium described herein, the sequence may be based on a mapping between the set of sequences and a set of data values corresponding, respectively, to a set of bits of the data, and where the data corresponds to uplink control information and transmitting at least the first instance of the sequence and the second instance of the sequence corresponds to transmitting at least the first instance of the sequence and the second instance of the sequence over an uplink control channel.

A method of wireless communications at a base station is described. The method may include determining, a configuration for repeating a sequence from a set of sequences over a resource allocation, the set of sequences configured for conveying data, transmitting, to the UE, an indication of the configuration that repeats the sequence over the resource allocation, receiving, from the UE, a first instance of the sequence and a second instance of the sequence based on the configuration, and performing error correction on the data based on the first instance of the sequence and the second instance of the sequence.

An apparatus for wireless communications at a base station is described. The apparatus may include a processor, memory coupled with the processor, and instructions stored in the memory. The instructions may be executable by the processor to cause the apparatus to determine, a configuration for repeating a sequence from a set of sequences over a resource allocation, the set of sequences configured for conveying data, transmit, to the UE, an indication of the configuration that repeats the sequence over the resource allocation, receive, from the UE, a first instance of the sequence and a second instance of the sequence based on the configuration, and perform error correction on the data based on the first instance of the sequence and the second instance of the sequence.

Another apparatus for wireless communications at a base station is described. The apparatus may include means for determining, a configuration for repeating a sequence from a set of sequences over a resource allocation, the set of sequences configured for conveying data, transmitting, to the UE, an indication of the configuration that repeats the sequence over the resource allocation, receiving, from the UE, a first instance of the sequence and a second instance of the sequence based on the configuration, and performing error correction on the data based on the first instance of the sequence and the second instance of the sequence.

A non-transitory computer-readable medium storing code for wireless communications at a base station is described. The code may include instructions executable by a processor to determine, a configuration for repeating a sequence from a set of sequences over a resource allocation, the set of sequences configured for conveying data, transmit, to the UE, an indication of the configuration that repeats the sequence over the resource allocation, receive, from the UE, a first instance of the sequence and a second instance of the sequence based on the configuration, and perform error correction on the data based on the first instance of the sequence and the second instance of the sequence.

Some examples of the method, apparatuses, and non-transitory computer-readable medium described herein may further include operations, features, means, or instructions for transmitting, to the UE, the configuration that repeats the sequence over the resource allocation via a radio resource control message, or a media access control control element message, or a downlink control information, or any combination thereof.

Some examples of the method, apparatuses, and non-transitory computer-readable medium described herein may further include operations, features, means, or instructions for determining a second configuration for a second resource allocation for second data, and transmitting, to the UE, an indication of the second configuration that repeats at least one sequence of the set of sequences over the second resource allocation, where transmitting the indication of the configuration and the indication of the second configuration includes transmitting via the radio resource control message, where the second configuration differs from the configuration.

In some examples of the method, apparatuses, and non-transitory computer-readable medium described herein, performing the error correction on the data may include operations, features, means, or instructions for performing the error correction for a set of resource allocations that include the resource allocation when the configuration may be signaled via the media access control control element message, or the downlink control information, or both.

In some examples of the method, apparatuses, and non-transitory computer-readable medium described herein, determining the configuration may include operations, features, means, or instructions for receiving one or more transmissions received over a channel, and determining the configuration based on the one or more transmissions received over a channel or a channel condition of the channel, or both.

In some examples of the method, apparatuses, and non-transitory computer-readable medium described herein, determining the configuration may include operations, features, means, or instructions for determining the configuration to repeat the sequence in a time domain, and where performing the error correction includes, and performing frequency error correction on the data based on the sequence being repeated in the time domain.

Some examples of the method, apparatuses, and non-transitory computer-readable medium described herein may further include operations, features, means, or instructions for determining that the one or more transmissions from the UE may be associated with a frequency error, where determining the configuration includes.

Some examples of the method, apparatuses, and non-transitory computer-readable medium described herein may further include operations, features, means, or instructions for determining the configuration to repeat the sequence in the time domain may be based on a Kronecker product associated with a discrete Fourier transform matrix of a size equal to half of a total number of orthogonal frequency division multiple symbols in the resource allocation and a cyclically shifted base sequence having a length corresponding to a number of frequency tones in the resource allocation.

In some examples of the method, apparatuses, and non-transitory computer-readable medium described herein, the first instance of the sequence may be spread over a first subset of the resource allocation in the time domain and the second instance of the sequence may be spread over a second subset of the resource allocation in the time domain.

In some examples of the method, apparatuses, and non-transitory computer-readable medium described herein, determining the configuration may include operations, features, means, or instructions for determining the configuration to repeat the sequence in a frequency domain, and where performing the error correction includes, and performing timing error correction on the data based on the sequence being repeated in the frequency domain.

Some examples of the method, apparatuses, and non-transitory computer-readable medium described herein may further include operations, features, means, or instructions for determining that the one or more transmissions from the UE may be associated with a timing error, where determining the configuration includes.

Some examples of the method, apparatuses, and non-transitory computer-readable medium described herein may further include operations, features, means, or instructions for determining the configuration to repeat the sequence in the frequency domain based on a Kronecker product associated with a discrete Fourier transform matrix having a size corresponding to a number of time periods in the resource allocation and a length of a cyclically shifted base sequence having a length equal to half of the number of frequency tones in the resource allocation.

In some examples of the method, apparatuses, and non-transitory computer-readable medium described herein, the first instance of the sequence may be spread over a first subset of the resource allocation in the frequency domain and the second instance of the sequence may be spread over a second subset of the resource allocation in the frequency domain.

In some examples of the method, apparatuses, and non-transitory computer-readable medium described herein, determining the configuration may include operations, features, means, or instructions for determining the configuration to repeat the sequence in a time domain and a frequency domain, where performing the error correction includes.

Some examples of the method, apparatuses, and non-transitory computer-readable medium described herein may further include operations, features, means, or instructions for determining that the one or more transmissions from the UE may be associated with a timing error and a frequency error, where determining the configuration includes, and determining the configuration to repeat the sequence in the frequency domain and the time domain based on the one or more transmissions from the UE being associated with the timing error and the frequency error.

Some examples of the method, apparatuses, and non-transitory computer-readable medium described herein may further include operations, features, means, or instructions for determining the configuration to repeat the sequence in the time domain and the frequency domain may be based on a Kronecker product associated with a discrete Fourier transform matrix having a number of time periods in the resource allocation and a length of a cyclically shifted base sequence having a number of frequency tones in the resource allocation.

In some examples of the method, apparatuses, and non-transitory computer-readable medium described herein, the first instance of the sequence may be spread over a first subset of the resource allocation in the time domain and the frequency domain, the second instance of the sequence may be spread over a second subset of the resource allocation in the time domain and the frequency domain, a third instance of the sequence may be spread over a third subset of the resource allocation in the time domain and the frequency domain, and a fourth instance of the sequence may be spread over a fourth subset of the resource allocation in the time domain and the frequency domain.

In some examples of the method, apparatuses, and non-transitory computer-readable medium described herein, performing the error correction on the data may include operations, features, means, or instructions for calculating a phase difference between a first OFDM symbol associated with the first instance of the sequence and a second OFDM symbol associated with the second instance of the sequence, and correcting a phase shift associated with the data based on the phase difference.

In some examples of the method, apparatuses, and non-transitory computer-readable medium described herein, the set of sequences includes orthogonal sequences when a size of the data does not satisfy a data threshold, and where the set of sequences includes non-orthogonal sequences when the size of the data satisfies the data threshold.

In some examples of the method, apparatuses, and non-transitory computer-readable medium described herein, a number of the set of sequences may be based on a number of time periods for conveying the data and a number of frequency tones for conveying the data.

In some examples of the method, apparatuses, and non-transitory computer-readable medium described herein, the sequence may be based on a mapping between the set of sequences and a set of data values corresponding, respectively, to a set of bits of the data.

BRIEF DESCRIPTION OF THE DRAWINGS

FIG. 3 illustrates an example of an orthogonal matrix and a base sequence that supports sequence design for noncoherent transmission with frequency and timing errors in accordance with aspects of the present disclosure.

DETAILED DESCRIPTION

Figure 1:
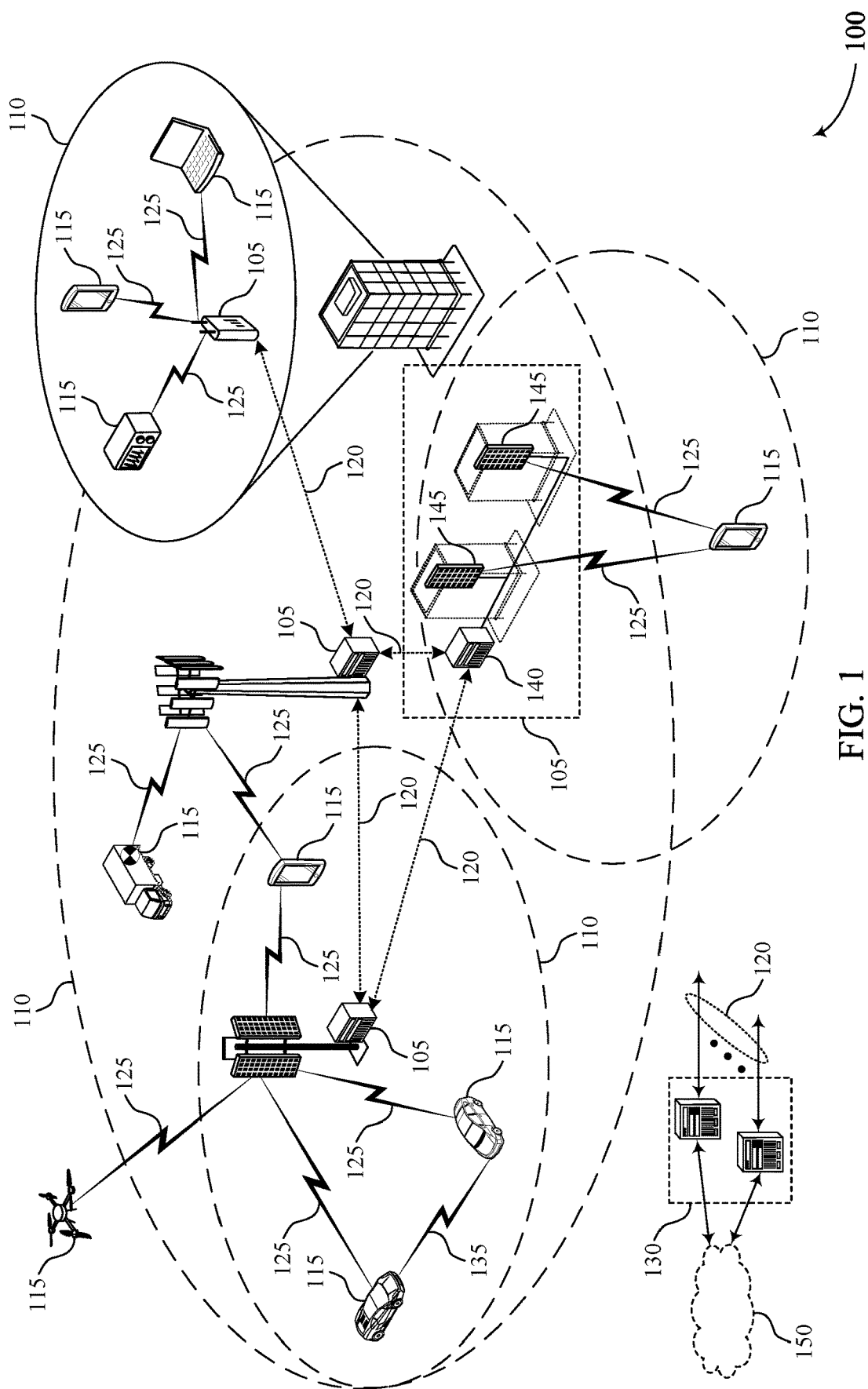
FIG. 1 illustrates an example of a system for wireless communications that supports sequence design for noncoherent transmission with frequency and timing errors in accordance with aspects of the present disclosure.

In some wireless communications systems, a user equipment (UE) may transmit a signal to a base station and the signal may include information (e.g., a payload). In some cases, the UE may transmit the information (e.g., the payload) in a resource allocation according to a selected sequence, which a network device may select from a set of sequences. But timing errors or frequency errors, or both, may degrade sequence detection performance for sequence-based transmissions from one device (e.g., a UE) to another (e.g., a base station).

Wireless communications systems may support communications between a UE and a base station. The UE and the base station may communicate over a channel allocated for communication between the UE and the base station. In some cases, the UE and the base station may transmit signals comprising information (e.g., a payload), such as a number of bits of information, to each other over the allocated resources in the channel. For example, the UE may transmit, to the base station, the payload of the signal according to a selected sequence (or codepoint) associated with the allocated resources. In some cases, the UE may use an orthogonal sequence or a non-orthogonal sequence to convey a payload. In some systems, however, such as fifth generation (5G) New Radio (NR) systems, the use of non-orthogonal sequences may fail to provide reliable and low-latency communication. For example, the UE, using non-orthogonal sequences for payload transmissions, may fail to meet reliability and low-latency constraints associated with communications over high-frequency radio frequency bands (e.g., FR2 radio frequency bands).

Additionally, or alternatively, in some wireless communications systems, residual timing and frequency error may exist at a receiver device (e.g., base station or UE), for example due to imperfections associated with time tracking loops (TTLs), or frequency tracking loops (FTLs), or both. The residual timing error or frequency error (or both) may degrade sequence detection performance for sequence-based transmissions, such as sequence-based PUCCH from a UE. In some cases, timing errors may result in the receiver device incorrectly attributing cyclically shifted (CS) index (e.g., CS(m)) to an adjacent CS index (e.g., CS(m+1)). In some cases, frequency errors may result in the receiver device incorrectly attributing a discrete Fourier transform (DFT) index (e.g., DFT(n)) to an adjacent DFT index (e.g., DFT(n+1)). For coherent transmissions, with the aid of demodulation reference signal (DMRS), the receiver device may estimate timing and frequency error based on DMRS, and then compensate for the timing and frequency error. However, for sequence-based non-coherent transmissions that may not include a DMRS, some other different systems do not address how to enable the receiver to compensate for time and frequency errors in transmissions without DMRS information.

The described techniques include a device, such as a base station or a UE, generating multiple sequences, for example, based on a Kronecker product of a DFT matrix having a number of time periods in a resource allocation and a CS base sequence having a length corresponding to a number of frequency tones in the resource allocation. The multiple sequences may be configured for conveying data based on a channel condition of a channel. In some cases, each sequence may be mapped to a particular sequence of bits (e.g., each possible combination of a sequence of bits from a 7-bit sequence of data mapped to a particular sequence from the multiple sequences). In some examples, the base station may receive, over a channel, one or more transmissions from a UE and determine a configuration for repeating a sequence from the multiple sequences over a resource allocation, where the sequence may be selected based on the sequence of bits in the data. The base station may transmit, to the UE, an indication of the configuration to help configure the UE to repeat a sequence over the resource allocation (repeat the sequence in the time domain, or frequency domain, or both), where the sequence may be for data transmitted to the base station by the UE via an uplink channel. The base station may receive, from the UE, at least two instances of the sequence according to the configuration. The base station may then perform error correction on the data (e.g., without DMRS information being transmitted) based on the base station analyzing one instance of the sequence relative to another instance of the sequence.

Particular aspects of the subject matter described herein may be implemented to realize one or more potential advantages. The described techniques improve sequence detection performance for sequence based transmissions, such as sequence based physical uplink control channel. The described techniques may provide for operations to compensate for timing errors and frequency errors associated with coherent or non-coherent transmissions. The described techniques may provide for compensating for timing errors and frequency errors for coherent and non-coherent transmissions when the transmissions do not include a demodulation reference signal (DMRS).

Aspects of the disclosure are initially described in the context of wireless communications systems. Aspects of the disclosure are further illustrated by and described with reference to apparatus diagrams, system diagrams, and flowcharts that relate to orthogonal matrices and base sequences. Aspects of the disclosure are further illustrated by and described with reference to apparatus diagrams, system diagrams, and flowcharts that relate to time frequency resource grids. Aspects of the disclosure are further illustrated by and described with reference to apparatus diagrams, system diagrams, and flowcharts that relate to sequence design for noncoherent transmission with frequency and timing errors.

FIG. 1 illustrates an example of a wireless communications system 100 that supports sequence design for noncoherent transmission with frequency and timing errors in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands (e.g., in the range of 300 megahertz (MHz) to 300 gigahertz (GHz)). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

In some implementations of the present disclosure, the UE 115 may transmit a signal including a payload (e.g., a multi-bit payload) to a base station 105 using a sequence (e.g., orthogonal sequence or non-orthogonal sequence). In some examples, the UE 115 may generate or be configured with a set of sequences, which may be referred to as a set of codepoints (e.g., orthogonal codepoints or non-orthogonal codepoints). In some aspects, orthogonal sequences may be orthogonal in both time and frequency. The number of sequences in the set of sequences may be based on a number of time periods, such as OFDM symbols, and a number of frequency tones, such as a number of subcarriers, that are allocated for transmitting a payload of data. For instance, the UE may determine a resource allocation of N OFDM symbols and M frequency tones and may accordingly determine N*M sequences.

In some examples, a base station 105 may receive on one or more transmissions from a UE 115 over a channel. In some examples, the base station 105 may determine a configuration for repeating a sequence from the set of sequences over a resource allocation. In some cases, the base station 105 may determine the configuration based on the one or more transmissions received over the channel or a channel condition of the channel, or both. In some examples, the base station 105 may transmit an indication of the configuration to the UE. In some examples, the configuration may be transmitted via a radio resource control (RRC) message, or a media access control-control element (MAC-CE) message, or a downlink control information (DCI), or any combination thereof. The configuration may indicate to repeat the selected sequence over the resource allocation. In some examples, the base station 105 may receive a first instance of the sequence and a second instance of the sequence from the UE based on the configuration indicating to repeat the selected sequence over the resource allocation. In some examples, the base station 105 may perform error correction on the data based on the first instance of the sequence and the second instance of the sequence.

Figure 2:
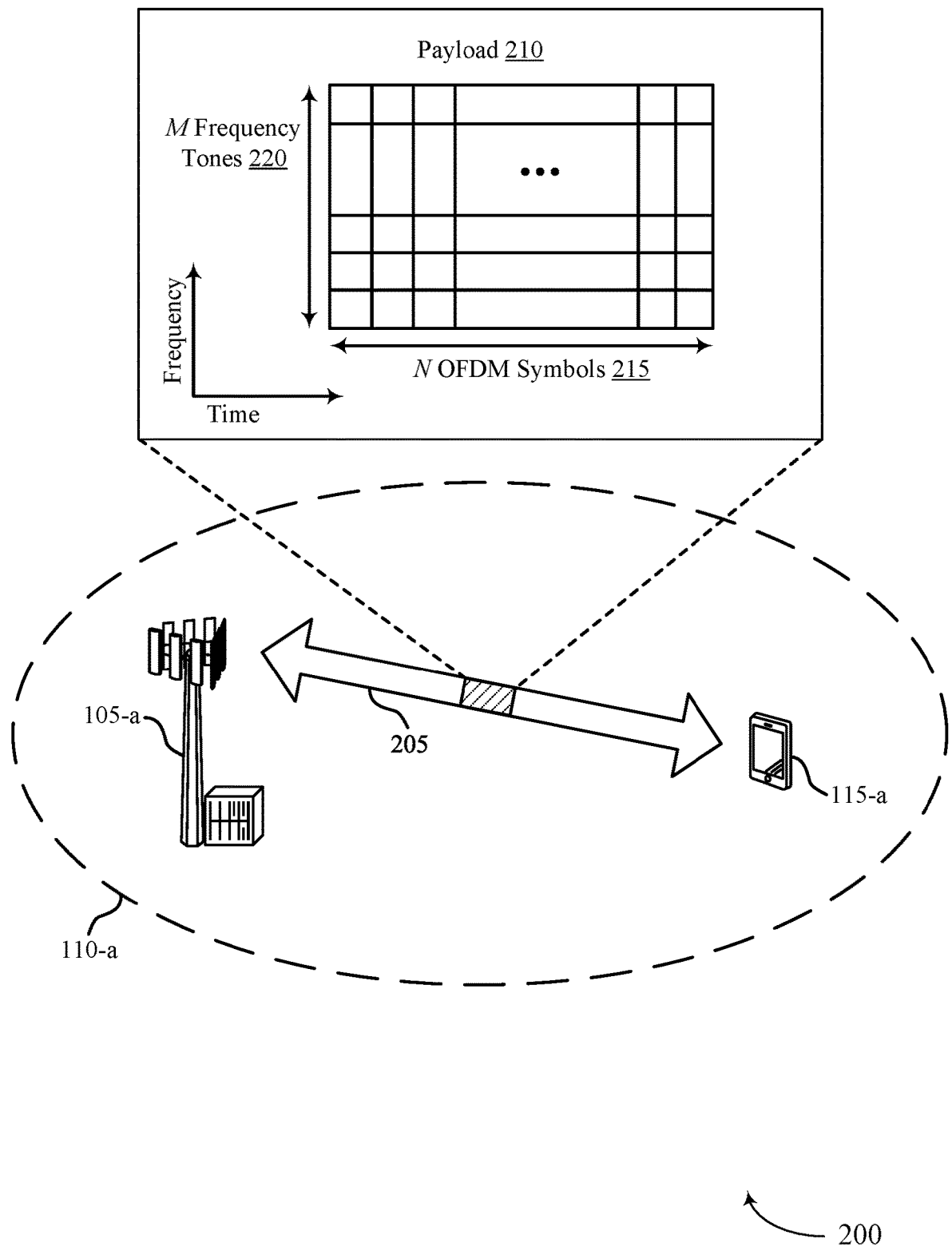
FIG. 2 illustrates an example of a wireless communications system that supports sequence design for noncoherent transmission with frequency and timing errors in accordance with aspects of the present disclosure.

FIG. 2 illustrates an example of a wireless communications system 200 that supports sequence design for noncoherent transmission with frequency and timing errors in accordance with aspects of the present disclosure. In some examples, wireless communications system 200 may implement aspects of wireless communications system 100.

The wireless communications system 200 may include a UE 115-a and a base station 105-a, which may be examples of corresponding devices as described herein. The UE 115-a and the base station 105-a may communicate via a communication link 205 within a geographic coverage area 110-a. In some examples, the UE 115 may transmit a signal including information (e.g., a payload 210) to the base station 105-a via the communication link 205. The payload 210 may occupy a resource allocation of N OFDM symbols 215 and M frequency tones 220 and the UE 115 may convey the payload 210 using a sequence from a set of sequences based on the N OFDM symbols 215 and the M frequency tones 220. In some examples, the set of sequences may include orthogonal sequences or non-orthogonal sequences (or both). In some cases, the set of sequences may include orthogonal sequences when a size of the payload does not satisfy (e.g., is below, or is at or below) a payload threshold. In some cases, the set of sequences may include non-orthogonal sequences when the size of the payload satisfies (e.g., is above, or is at or above) the payload threshold.

As described herein, N may correspond to any number, but may sometimes be defined within the range of 1 to 14. Similarly, M may correspond to any number, but may sometimes be defined within the range of 1 to 12. In some cases, such as when N=14 and M=12, the resource allocation may be a resource block. Further, as described herein, the payload 210 may be an example of any signal including information (e.g., a number of bits) and, although described in the context of transmission from the UE 115-a, may be transmitted by either the UE 115-a or the base station 105-a. In some examples, the payload 210 may be an example of uplink control information and, accordingly, the UE 115-a may transmit the payload 210 in a resource allocation of a physical uplink control channel (PUCCH). In such examples, the N OFDM symbols 215 and the M frequency tones 220 may correspond to a time and frequency resource grid assigned to the PUCCH for UE 115-a to transmit the payload 210.

In some cases, the wireless communications system 200 may be associated with some latency and reliability conditions or constraints that support communications between the UE 115-a and the base station 105-a. For example, in some cases, the wireless communications system 200 may support communications between the UE 115-a and the base station 105-a based on maintaining low-latency and highly-reliable transmissions between the UE 115-a and the base station 105-a. Such low-latency and high-reliability conditions may be further tightened for communications in high-frequency radio frequency bands, such as communications in an FR2 radio frequency band (e.g., a millimeter wave (mmW) radio frequency band).

In some examples, the UE 115-a may use one or more non-orthogonal sequences (or codepoints) to convey the payload 210. For example, the UE 115-a may generate or be configured with a codebook of non-orthogonal sequences and the UE 115-a may select one or more non-orthogonal sequences from the codebook to convey the payload 210. In some circumstances, however, such use of one or more non-orthogonal sequences may fail to meet the latency or reliability constraints of the wireless communications system 200, which may decrease the likelihood for successful communications between the UE 115-a and the base station 105-a.

In some implementations of the present disclosure, the UE 115-*a* or the base station 105-*a*, or both, may identify a set of orthogonal sequences from which the UE 115-*a* may select a sequence for conveying the payload 210. In some cases, such use of orthogonal sequences to convey the payload 210 may provide for low-latency and reliable communications with the base station 105-*a*. Accordingly, the wireless communications system 200, based on supporting orthogonal sequences for conveying a payload 210, may increase the likelihood for successful communications between the UE 115-*a* and the base station 105-*a*.

In some examples, the UE 115-*a* or the base station 105-*a*, or both, may generate a number of orthogonal sequences based on the resources allocated for the payload 210. For example, the UE 115-*a* and the base station 105-*a* may communicate via a resource allocation of a communication channel and the UE 115-*a*, or the base station 105-*a*, or both, may generate a number of orthogonal sequences based on the resource allocation. For instance, the base station 105-*a* may allocate N OFDM symbols 215 and M frequency tones 220 for transmission of the payload 210 and, accordingly, the UE 115-*a* or the base station 105-*a*, or both, may generate a number of orthogonal sequences, for example, equal to N*M. In some aspects, each orthogonal sequence of the set of orthogonal sequences may have a length equal to the size of the resource allocation (e.g., the number of resource elements in the resource allocation, or N*M), such that each orthogonal sequence may convey the payload 210 across the resource allocation. As such, in some examples, the UE 115-*a*, or the base station 105-*a*, or both, may generate a set of N*M orthogonal sequences and each orthogonal sequence may be associated with a length of N*M. The generation of the set of orthogonal sequences is described in more detail with reference to FIG. 3.

In some examples, a network device (e.g., base station 105-*a* or UE 115-*a*) may generate multiple sequences based on a Kronecker product of a DFT matrix having a number of time periods in a resource allocation and a cell-specific base sequence having a length corresponding to a number of frequency tones in the resource allocation. The multiple sequences may be configured for conveying data based on a channel condition of a channel (e.g., a condition of an uplink channel, condition of a physical uplink control channel, condition of a physical uplink shared channel, etc.). In some cases, each sequence may be mapped to a particular sequence of bits (e.g., each possible combination of a sequence of bits from a 7-bit sequence of data mapped to a particular sequence from the multiple sequences). In some examples, the base station 105-*a* may receive, over a channel, one or more transmissions from UE 115-*a* and determine a configuration for repeating a sequence from the multiple sequences over a resource allocation, where the sequence is selected based on the sequence of bits in the data. The base station 105-*a* may transmit, to UE 115-*a*, an indication of the configuration to configure UE 115-*a* to repeat a sequence over the resource allocation (repeat the sequence in the time domain, or frequency domain, or both), where the sequence may be for data transmitted to base station 105-*a* by UE 115-*a* over an uplink channel.

In some examples, the base station 105-*a* may transmit the configuration and the UE 115-*a* may apply the configuration to multiple transmissions, multiple payloads, or multiple sets of physical uplink control channel resources. In some cases, when the configuration is signaled via a media access control-control element (MAC-CE) message or a downlink control information (DCI) the configuration may be used for multiple resource allocations (e.g., a first resource allocation, a second resource allocation separate from the first resource allocation, etc.). In some cases, when the configuration is signaled via a radio resource control (RRC) message, the base station may transmit the configuration for multiple resource allocations or may transmit multiple configurations for multiple sets of physical uplink control channel resources (e.g., a first configuration for a first resource allocation and a second configuration for a second resource allocation, etc.). In some examples, the base station 105-*a* may transmit a first configuration that indicates repeating a first sequence in the time domain and may transmit a second configuration that indicates repeating a second sequence in the frequency domain.

The base station 105-*a* may receive, from UE 115-*a*, at least two instances of the sequence according to the configuration. The base station 105-*a* may then perform error correction on the data (e.g., without DMRS information being transmitted) based on the base station 105-*a* analyzing one instance of the sequence relative to another instance of the sequence (e.g., the first instance of the sequence relative to the second instance of the sequence).

The UE 115-*a*, implementing the described techniques, may efficiently construct a codebook of orthogonal sequences and select one of the orthogonal sequences to convey the payload 210 based on the number of bits in the payload 210, which may increase the likelihood that the base station 105-*a* is able to successfully receive the payload 210 while avoiding unnecessary storage costs associated with storing the full set of generated orthogonal sequences. Moreover, the described techniques may support and maintain a low PAPR associated with the transmission of the payload 210, which may enable to the UE 115-*a* to more use a greater transmit power when transmitting the payload 210, among other advantages.

FIG. 3 illustrates an example of an orthogonal matrix 300 and a base sequence 305 that supports sequence design for noncoherent transmission with frequency and timing errors in accordance with aspects of the present disclosure. In some examples, orthogonal matrix 300 and base sequence 305 may be implemented by or may implement aspects of wireless communications system 100 and wireless communications system 200. For example, a UE 115, or a base station 105, or both, may use the orthogonal matrix 300 and the base sequence 305 to generate a set of orthogonal sequences from which the UE 115 *a* may select an orthogonal sequence to convey a payload to the base station 105. The UE 115 and the base station 105 may be examples of corresponding devices as described herein.

The orthogonal matrix 300, which may be referred to as W, may be an orthogonal, square matrix of size N (i.e., an N×N matrix). In some implementations, N may be equal to the number of symbols of a resource allocation associated with transmission of the payload, as described in more detail with reference to FIG. 2. Further, in some specific examples, the orthogonal matrix 300 may be a DFT matrix and, as such, may be referred to as a DFT matrix. Accordingly, a row or a column of the orthogonal matrix 300 (e.g., a vector) may be referred to as either $\vec{w}(n)$ or $\overrightarrow{\mathrm{DFT}}(n)$, where n is an index of the row or the column of the orthogonal matrix 300 (e.g., the $n^{th}$ row or column). Although FIG. 3 illustrates n=1, n may be equal to any number n=0, 1, 2, . . . , N−1. A row of the orthogonal matrix 300 is defined by Equation 1, shown below.

$$\overrightarrow{\mathrm{DFT}}(n) = [\omega^{0n}, \omega^{1n}, \omega^{2n}, \ldots, \omega^{in}, \ldots, \omega^{(N-1)n}] \quad (1)$$

The corresponding column of the orthogonal matrix 300 may be equal to $\overrightarrow{DFT}(n)^T$. In Equation 1, ω may be defined as either $\omega = e^{-j2\pi/N}$ or $\omega = e^{j2\pi/N}$. Each column of the vector $\overrightarrow{DFT}(n)$ (or each row of the vector $\overrightarrow{DFT}(n)^T$) may correspond to an OFDM symbol index i, where i=0 in the first column (i.e., the left-most column) of the orthogonal matrix 300 and increments by one to i=N−1 in the last column (i.e., the right-most column) of the orthogonal matrix 300. In some cases, an OFDM symbol index i may correspond to an OFDM symbol of the resource allocation that the UE 115 may use to transmit the payload. In some cases, the phase ramp of a row or a column of the orthogonal matrix 300 may be defined as i*n, where i is the OFDM symbol index and n may describe the slope of the phase change. As such, a column or a row of the orthogonal matrix 300 may include entries for each OFDM symbol of the resource allocation in one frequency tone.

The base sequence 305, which may be referred to as a base sequence $\vec{S}(m)$, may be a cyclically shifted frequency-domain base sequence. In other words, the base sequence 305 may be a frequency-domain base sequence S associated with a cyclic shift in the time-domain. As such, the base sequence S may be based on a cyclic shift index m, where m=0, 1, 2, . . . , M−1. In some aspects, M may be equal to the number of frequency tones of a resource allocation associated with the transmission of the payload, as described in more detail with reference to FIG. 2. The base sequence S may be associated with a phase ramp vector in the frequency domain, such as $e^{-j2\pi lm/M}$ or $e^{j2\pi lm/M}$, and the phase ramp vector and the base sequence S may be multiplied together to determine the base sequence $\vec{S}(m)$, as shown by base sequence 305.

For example, the UE 115, or the base station 105, or both, may perform a DFT or a fast Fourier transform (FFT) of the base sequence S in the frequency-domain to convert the base sequence S to the time-domain, where the time-domain representation of the base sequence S, which may be referred to as $\tilde{S}$, has a length M. The UE 115, or the base station 105, or both, may apply a cyclic shift index m to $\tilde{S}$ to shift $\tilde{S}$ by index m, which may adjust (e.g., effectively move) the entries of $\tilde{S}$ forward or backward by m in a cyclic fashion. The time-domain cyclic shift may correspond to the frequency-domain phase ramp vector $e^{-j2\pi lm/M}$ or $e^{j2\pi lm/M}$. The index m of the phase ramp may correspond to a slope of the phase ramp (e.g., the phase ramp may be defined as m/M) and the index l may correspond to a tone index of the resource allocation. As shown in base sequence 305, S(0), S(1), S(2), . . . , S(l), . . . , S(M−1) may correspond to entries of the base sequence S for each frequency tone l=0, 1, 2, . . . , M−1. Accordingly, the base sequence 305 may include entries for each frequency tone of the resource allocation in one OFDM symbol.

In some cases, the base sequence 305 may be a cell-specific base sequence, such that each UE 115 within a cell of the base station 105 (e.g., within a geographic coverage area of the base station 105) may use the same base sequence 305. Further, in some cases, the base sequence 305 may have a low PAPR property and may be referred to as a low PAPR sequence. In some cases, a cyclic shift in the time-domain and a phase ramp in the frequency domain may avoid affecting the PAPR of the base sequence, thus maintaining the PAPR associated with the base sequence 305.

As illustrated in FIG. 3, the base sequence 305 may be a vector of size M×1. Additionally, or alternatively, there may be a number of base sequences 305 equal to the number of cyclic shift indices associated with the base sequence 305. For instance, there may be M base sequences 305 (i.e., one base sequence $\vec{S}(m)$ for each of m=0, 1, 2, . . . , M−1). Further, each row of the base sequence 305 may correspond to a frequency tone index l, where l=0 in the first row (i.e., the bottom row) and increments by one to l=M−1 in the last column (i.e., the top row). As such, each frequency tone index l may correspond to a frequency tone of the resource allocation associated with the transmission of the payload. Accordingly, a number of base sequences 305 (e.g., a number equal to M) may be considered, and the number of base sequences 305 may be visualized as a matrix of base sequences $\vec{S}(m)$ of dimensions M×M (e.g., M cyclic shifts×M frequency tones).

As described herein, the UE 115, or the base station 105, or both, may generate a set of orthogonal sequences. In some examples, the UE 115, or the base station 105, or both, may generate a number of orthogonal sequences based on a product, such as a Kronecker product, of the orthogonal matrix 300 and each of the number of base sequences 305. The Kronecker product of the orthogonal matrix 300 and each of the number of base sequences 305 may involve determining the Kronecker product of each row or column n of the orthogonal matrix 300 and each cyclic shift index m of the base sequence 305, and repeating the operation for all permutations of n and m, where n=0, 1, . . . , N−1 and m=0, 1, . . . , M−1.

As such, the number of orthogonal sequences in the set may be equal to the product of the dimensions of the orthogonal matrix 300 and a matrix representation of the base sequences 305. For instance, the orthogonal matrix 300 may be a matrix of size N×N and the base sequences 305 may be represented by a matrix of size M×M and, therefore, the Kronecker product between the two may result in an (N*M)×(N*M) matrix (e.g., an orthogonal (N*M)×(N*M) matrix). In other words, the UE 115, or the base station 105, or both, may generate a number of orthogonal sequences equal to N*M and each orthogonal sequence may have a length of N*M. As such, each orthogonal sequence may have a length equal to the number of resource elements (e.g., the number of OFDM symbol×frequency tone resource elements) included in the resource grid that is allocated to the UE 115 for transmission of the payload. Further, based on using a Kronecker product of the orthogonal matrix 300 and the base sequence 305, the signal transmitted on each OFDM symbol may have the same PAPR as the base sequence 305, which may improve the coverage area of the UE 115 because the UE 115 may drive a power amplifier to a set power ratio and use a maximum transmit power of the UE 115 to transmit the signal, among other advantages.

Figure 4:
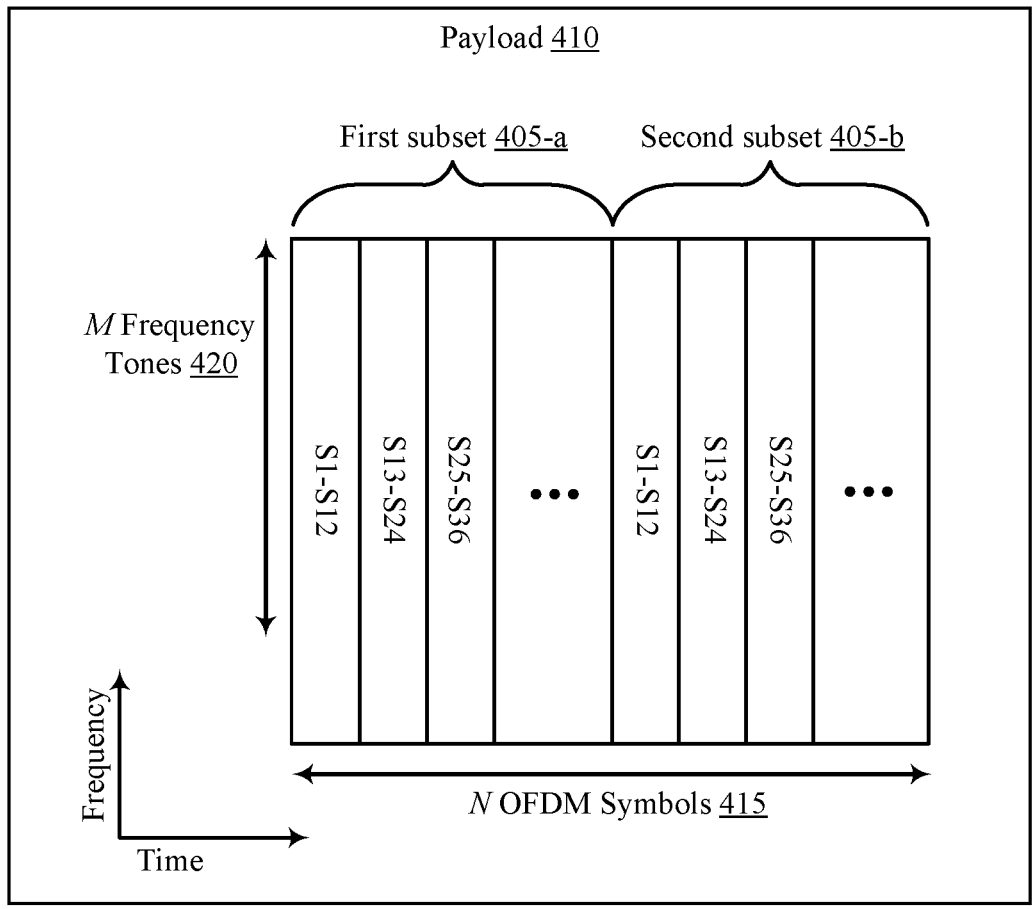
FIG. 4 illustrates an example of a time frequency resource grid that supports sequence design for noncoherent transmission with frequency and timing errors in accordance with aspects of the present disclosure.

FIG. 4 illustrates an example of a time frequency resource grid 400 (e.g., a time frequency resource grid assigned to a physical uplink control channel) that supports sequence design for noncoherent transmission with frequency and timing errors in accordance with aspects of the present disclosure. In some examples, time frequency resource grid 400 may be implemented by or may implement aspects of wireless communications system 100.

In some examples, one or more operations associated with time frequency resource grid 400 may be performed by a UE and/or a base station (e.g., UE 115 or base station 105 of FIG. 1 or FIG. 2). In some examples, a UE 115 may transmit a signal including a payload 410 to a base station 105 via a communication link (e.g., communication link 205). The payload 410 may occupy a resource allocation of N OFDM symbols 415 and M frequency tones 420 and the UE 115 may convey the payload 410 using a sequence based on the N OFDM symbols 415 and the M frequency tones 420.

In some examples, base station 105 or UE 115 may select a sequence from a set of sequences (e.g., orthogonal sequence or non-orthogonal sequence) to convey payload 410 based on the number of bits in the payload 410. In some cases, base station 105 may determine a configuration for repeating the selected sequence over the resource allocation of time frequency resource grid 400. In some examples, base station 105 may determine the configuration based on one or more transmissions that base station 105 receives from UE 115 over a channel, or based on a channel condition of the channel, or based on both. In some cases, base station 105 may detect frequency errors based on the one or more transmissions or the channel condition of the channel, or both. When base station 105 detects frequency errors, the base station 105 may configure the configuration to repeat the selected sequence in the time domain. In some cases, base station 105 may transmit an indication of the configuration to UE 115.

In some cases, base station 105 may determine whether to repeat the sequence in time, repeat the sequence in frequency, or repeat the sequence both in time and in frequency based on one or more transmissions the base station receives from a UE 115. In some cases, a base station 105 may determine that a channel quality drops below a channel quality threshold, or that the channel quality drops below the channel quality threshold for at least a predetermined amount of time. In some examples, base station 105 may determine whether to repeat a sequence in time, repeat the sequence in frequency, or repeat the sequence in time and frequency based on the channel quality dropping below the channel quality threshold, or the channel quality dropping below the channel quality threshold for at least the predetermined amount of time.

In some examples, base station 105 may determine that a number of timing errors associated with transmissions received from a UE 115 meet or exceed a time error threshold, or that the number of timing errors meet or exceed the time error threshold for at least a predetermined amount of time. In some examples, base station 105 may determine that a number of frequency errors associated with transmissions received from a UE 115 meet or exceed a time error threshold, or that the number of frequency errors meet or exceed the time error threshold for at least a predetermined amount of time. In some cases, base station 105 may determine whether to repeat a set of orthogonal sequences in time, repeat the sequence in frequency, or repeat the sequence in time and frequency based on the number of timing errors meeting or exceeding the time error threshold, or based on the number of timing errors meeting or exceeding the time error threshold for at least the predetermined amount of time, or based on the number of frequency errors meet or exceed the time error threshold, or based on the number of frequency errors meet or exceed the time error threshold for at least the predetermined amount of time, or based on any combination thereof. In some cases, base station 105 may determine to repeat a set of orthogonal sequences in time based on the number of frequency errors or a degree of error in one or more frequency errors, and may determine to repeat a set of orthogonal sequences in frequency based on the number of timing errors or a degree of error in one or more timing errors.

In the illustrated example, the configuration may indicate to repeat the selected sequence in the time domain. Accordingly, UE 115 may repeat the sequence over the N OFDM symbols 415. As shown, UE 115 may transmit the selected sequence over, for example, a first subset 405-a (which may be a first half in some examples or may be a different subset in other examples such as greater than one half, less than one half, a third, a quarter, etc.) of the resource allocation in the time domain (e.g., N/2 OFDM symbols) and transmit the same selected sequence over, for example, a second subset 405-b (which may be a second half in some examples or may be a different subset in other examples) of the resource allocation in the time domain (e.g., N/2 OFDM symbols). In some cases, a length of the sequence may be halved. In some cases, the Kronecker product may use a half-size DFT matrix based on the sequence being halved. In some cases, the selected sequence in the first subset 405-a of the resource allocation may have a length of N/2*M and the selected sequence in the second subset 405-b of the resource allocation may have a length of N/2*M.

In some examples, base station 105 may receive from UE 115 a first instance of the selected sequence from first subset 405-a and a second instance of the selected sequence from second subset 405-b based at least in part on the configuration. In some cases, base station 105 may perform error correction on the data of payload 410 based at least in part on the first instance of the selected sequence and the second instance of the selected sequence. Since first subset 405-a and second subset 405-b transmit identical selected sequences, base station 105 may determine (e.g., calculate) a phase difference between each pair of OFDM symbols in the two copies of sequences (e.g., received sequences). In some cases, the base station 105 may determine (e.g., estimate, calculate) one or more frequency errors in the data (e.g., codepoints) based on the phase difference and then compensate for the determined one or more frequency errors.

Figure 5:
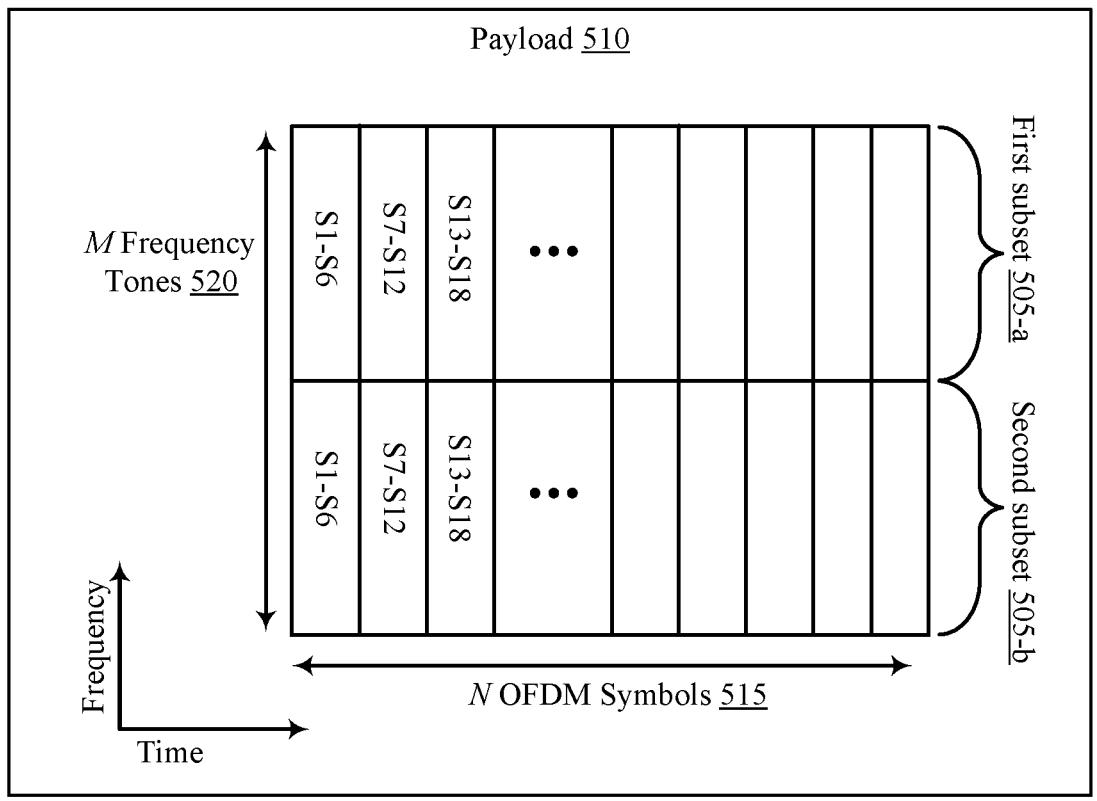
FIG. 5 illustrates an example of a time frequency resource grid that supports sequence design for noncoherent transmission with frequency and timing errors in accordance with aspects of the present disclosure.

FIG. 5 illustrates an example of a time frequency resource grid 500 that supports sequence design for noncoherent transmission with frequency and timing errors in accordance with aspects of the present disclosure. In some examples, time frequency resource grid 500 may be implemented by or may implement aspects of wireless communications system 100.

In some examples, one or more operations associated with time frequency resource grid 500 may be performed by a UE and/or a base station (e.g., UE 115 or base station 105 of FIG. 1 or FIG. 2). In some examples, a UE 115 may transmit a signal including a payload 510 to a base station 105 via a communication link (e.g., communication link 205). The payload 510 may occupy a resource allocation of N OFDM symbols 515 and M frequency tones 520 and the UE 115 may convey the payload 510 using a sequence based on the N OFDM symbols 515 and the M frequency tones 520.

In some examples, base station 105 or UE 115 may select a sequence from a set of sequences (e.g., orthogonal sequence or non-orthogonal sequence) to convey payload 510 based on the number of bits in the payload 510. In some cases, base station 105 may determine a configuration for repeating the selected sequence over the resource allocation of time frequency resource grid 500. In some examples, base station 105 may determine the configuration based on one or more transmissions that base station 105 receives from UE 115 over a channel, or based on a channel condition of the channel, or based on both. In some cases, base station 105 may detect timing errors based on the one or more transmissions or the channel condition of the channel, or both. When base station 105 detects timing errors, the base station 105 may configure the configuration to repeat the selected sequence in the frequency domain. In some cases, base station 105 may transmit an indication of the configuration to UE 115.

In the illustrated example, the configuration may indicate to repeat the selected sequence in the frequency domain. Accordingly, UE 115 may repeat the sequence over the M frequency tones 520. As shown, UE 115 may transmit the selected sequence over a first subset 505-*a* (which may be a first half in some examples or may be a different subset in other examples) of the resource allocation in the frequency domain (e.g., M/2 resource elements) and transmit the same selected sequence over a second subset 505-*b* (which may be a second half in some examples or may be a different subset in other examples) of the resource allocation in the frequency domain (e.g., M/2 resource elements). In some cases, a length of the sequence may be halved. In some cases, the Kronecker product may use a half-size base sequence S' of length M/2 based on the selected sequence being halved (e.g., base sequence S' based on a cyclic shift index m, where m=0, 1, 2, . . . , M/2). In some cases, the selected sequence in the first subset 505-*a* of the resource allocation may have a length of N*M/2 and the selected sequence in the second subset 505-*b* of the resource allocation may have a length of N*M/2.

In some examples, base station 105 may receive from UE 115 a first instance of the selected sequence from first subset 505-*a* and a second instance of the selected sequence from second subset 505-*b* based at least in part on the configuration. In some cases, base station 105 may perform error correction on the data of payload 510 based at least in part on the first instance of the selected sequence and the second instance of the selected sequence. Since first subset 505-*a* and second subset 505-*b* transmit identical selected sequences, base station 105 may determine (e.g., calculate) a phase difference between each pair of resource elements in the two copies of the selected sequences (e.g., received sequences). In some cases, the base station 105 may determine (e.g., estimate) one or more timing errors in the data (e.g., codepoints) based on the phase difference and then compensate for the determined one or more timing errors.

Figure 6:
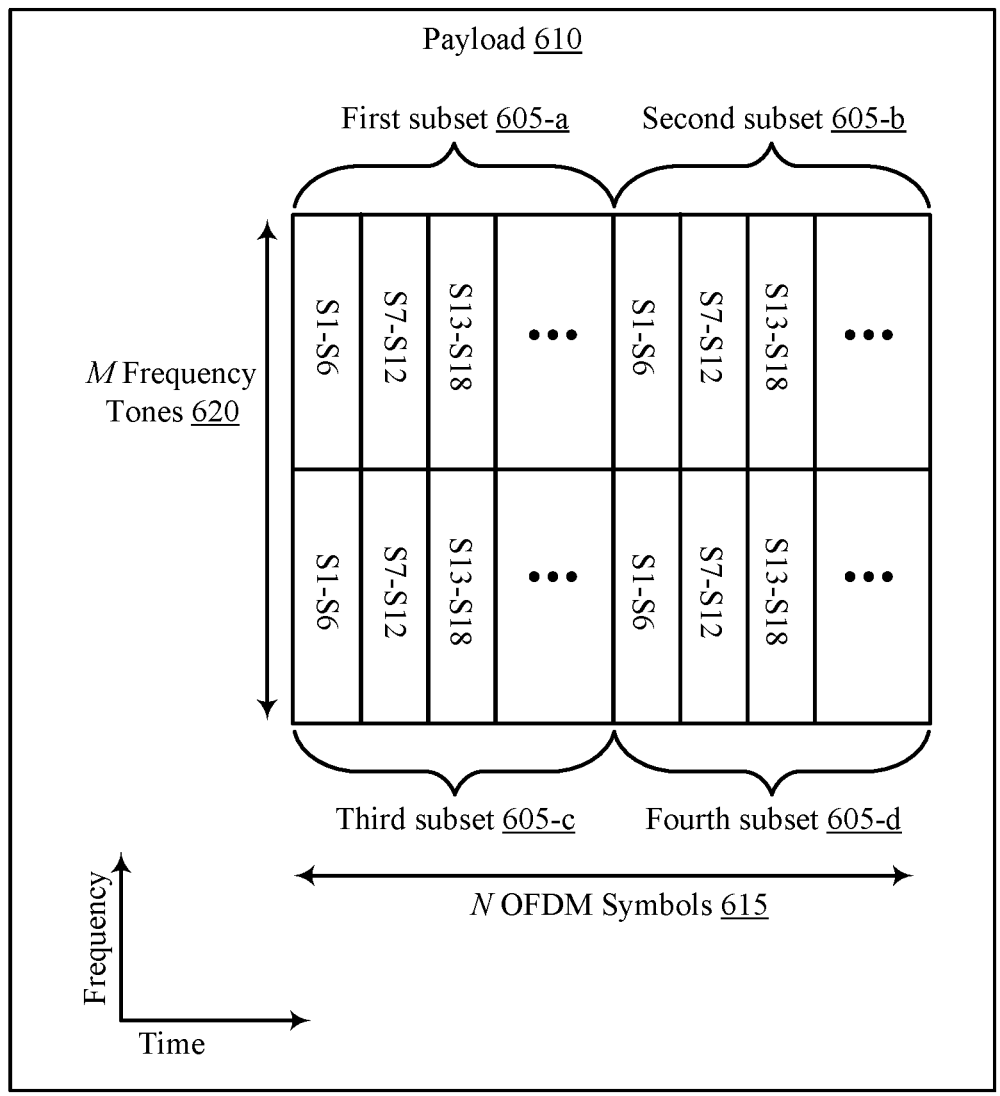
FIG. 6 illustrates an example of a time frequency resource grid that supports sequence design for noncoherent transmission with frequency and timing errors in accordance with aspects of the present disclosure.

FIG. 6 illustrates an example of a time frequency resource grid 600 that supports sequence design for noncoherent transmission with frequency and timing errors in accordance with aspects of the present disclosure. In some examples, time frequency resource grid 600 may be implemented by or may implement aspects of wireless communications system 100.

In some examples, one or more operations associated with time frequency resource grid 600 may be performed by a UE and/or a base station (e.g., UE 115 or base station 105 of FIG. 1 or FIG. 2). In some examples, a UE 115 may transmit a signal including a payload 610 to a base station 105 via a communication link (e.g., communication link 205). The payload 610 may occupy a resource allocation of N OFDM symbols 615 and M frequency tones 620 and the UE 115 may convey the payload 610 using a sequence based on the N OFDM symbols 615 and the M frequency tones 620.

In some examples, base station 105 or UE 115 may select a sequence from a set of sequences (e.g., orthogonal sequence or non-orthogonal sequence) to convey payload 610 based on the number of bits in the payload 610. In some cases, base station 105 may determine a configuration for repeating the selected sequence over the resource allocation of time frequency resource grid 600. In some examples, a base station 105 may determine the configuration based on one or more transmissions that base station 105 receives from a UE 115 over a channel, or based on a channel condition of the channel, or based on both. In some cases, base station 105 may detect timing errors and frequency errors based on the one or more transmissions or the channel condition of the channel, or both. When base station 105 detects timing errors and frequency errors, the base station 105 may configure the configuration to repeat the selected sequence in the frequency domain and in the time domain. In some cases, base station 105 may transmit an indication of the configuration to UE 115.

In the illustrated example, the configuration may indicate to repeat the selected sequence in the time domain. The configuration may also indicate to repeat the selected sequence in the frequency domain. In some cases, the Kronecker product may use a half-size DFT matrix of length N/2 based on the sequence being repeated in the time domain and a half-size base sequence S' of length M/2 based on the selected sequence being repeated in the frequency domain. In some cases, the selected sequence in a first subset 605-*a* (which may be a first quarter in some examples or may be a different subset in other examples) of the resource allocation may have a length of N/2*M/2, the selected sequence in a second subset 605-*b* (which may be a first quarter in some examples or may be a different subset in other examples) of the resource allocation may have a length of N/2*M/2, the selected sequence in a third subset 605-*c* (which may be a third quarter in some examples or may be a different subset in other examples) of the resource allocation may have a length of N/2*M/2 and the selected sequence in a fourth subset 605-*d* (which may be a fourth quarter in some examples or may be a different subset in other examples) of the resource allocation may have a length of N/2*M/2.

Accordingly, UE 115 may repeat the sequence over the N OFDM symbols 615 and repeat the sequence over the M frequency tones 620. As shown, UE 115 may transmit the selected sequence over a first subset 605-*a* of the resource allocation (e.g., N/2 by M/2 resource elements), transmit the same selected sequence over a second subset 605-*b* of the resource allocation (e.g., N/2 by M/2 resource elements), transmit the selected sequence over a third subset 605-*c* of the resource allocation (e.g., N/2 by M/2 resource elements), and transmit the same selected sequence over a fourth subset 605-*d* of the resource allocation (e.g., N/2 by M/2 resource elements).

In some examples, base station 105 may receive from UE 115 a first instance of the sequence from first subset 605-*a*, a second instance of the sequence from second subset 605-*b*, a third instance of the sequence from third subset 605-*c*, and a fourth instance of the sequence from fourth subset 605-*d* based at least in part on the configuration. In some cases, base station 105 may perform error correction on the data of payload 610 based at least in part on the first instance of the sequence, the second instance of the sequence, the third instance of the sequence and the fourth instance of the sequence. Since first subset 605-*a* and second subset 605-*b*, as well as third subset 605-*c* and fourth subset 605-*c*, transmit identical sequences over the time domain, base station 105 may determine (e.g., calculate) a phase difference between each pair of OFDM symbols in either or both of these sets of time-domain-repeated sequences. In some cases, the base station 105 may determine (e.g., estimate) one or more frequency errors in the data (e.g., codepoints) based on the phase difference and then compensate for the determined one or more frequency errors. And since first subset 605-*a* and second subset 605-*b*, as well as third subset 605-*c* and fourth subset 605-*c*, transmit at least some identical sequences over the frequency domain, base station 105 may base station 105 may determine (e.g., calculate) a phase difference between each pair of OFDM symbols in either or both of the sets of frequency-domain-repeated sequences. In some cases, the base station 105 may determine (e.g., estimate) one or more timing errors in the data (e.g., codepoints) based on the phase difference and then compensate for the determined one or more timing errors.

Figure 7:
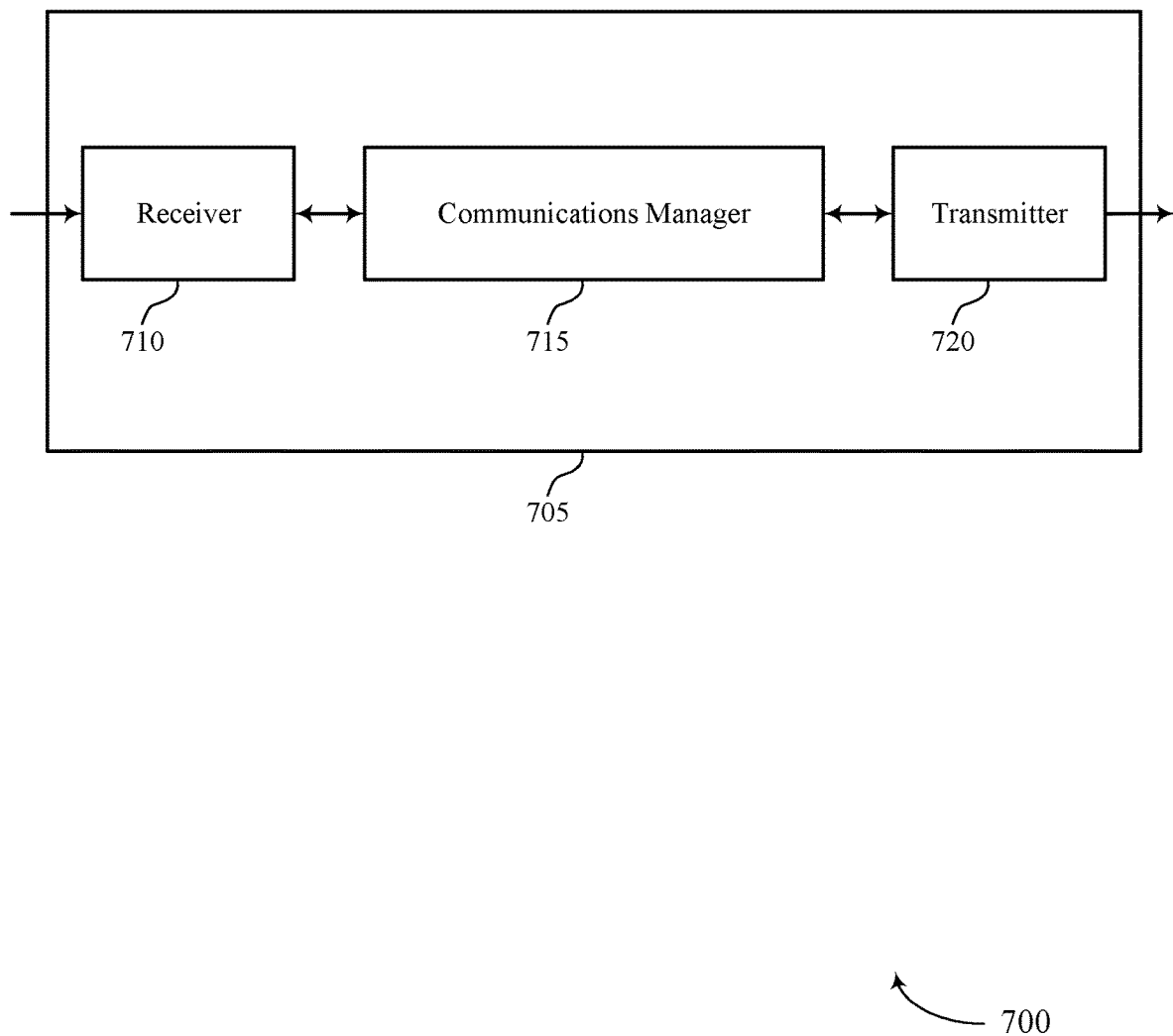
FIGS. 7 and 8 show block diagrams of devices that support sequence design for noncoherent transmission with frequency and timing errors in accordance with aspects of the present disclosure.

FIG. 7 shows a block diagram 700 of a device 705 that supports sequence design for noncoherent transmission with frequency and timing errors in accordance with aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to sequence design for noncoherent transmission with frequency and timing errors, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may transmit, to a base station, one or more transmissions over a channel. The communications manager 715 may receive, from a base station, an indication of a configuration that repeats a sequence from a set of sequences over a resource allocation, the set of sequences configured for conveying a data. The communications manager 715 may transmit, to the base station, at least a first instance of the sequence and a second instance of the sequence based on the configuration. The communications manager 715 may be an example of aspects of the communications manager 1010 described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a DSP, an application-specific integrated circuit (ASIC), an FPGA or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
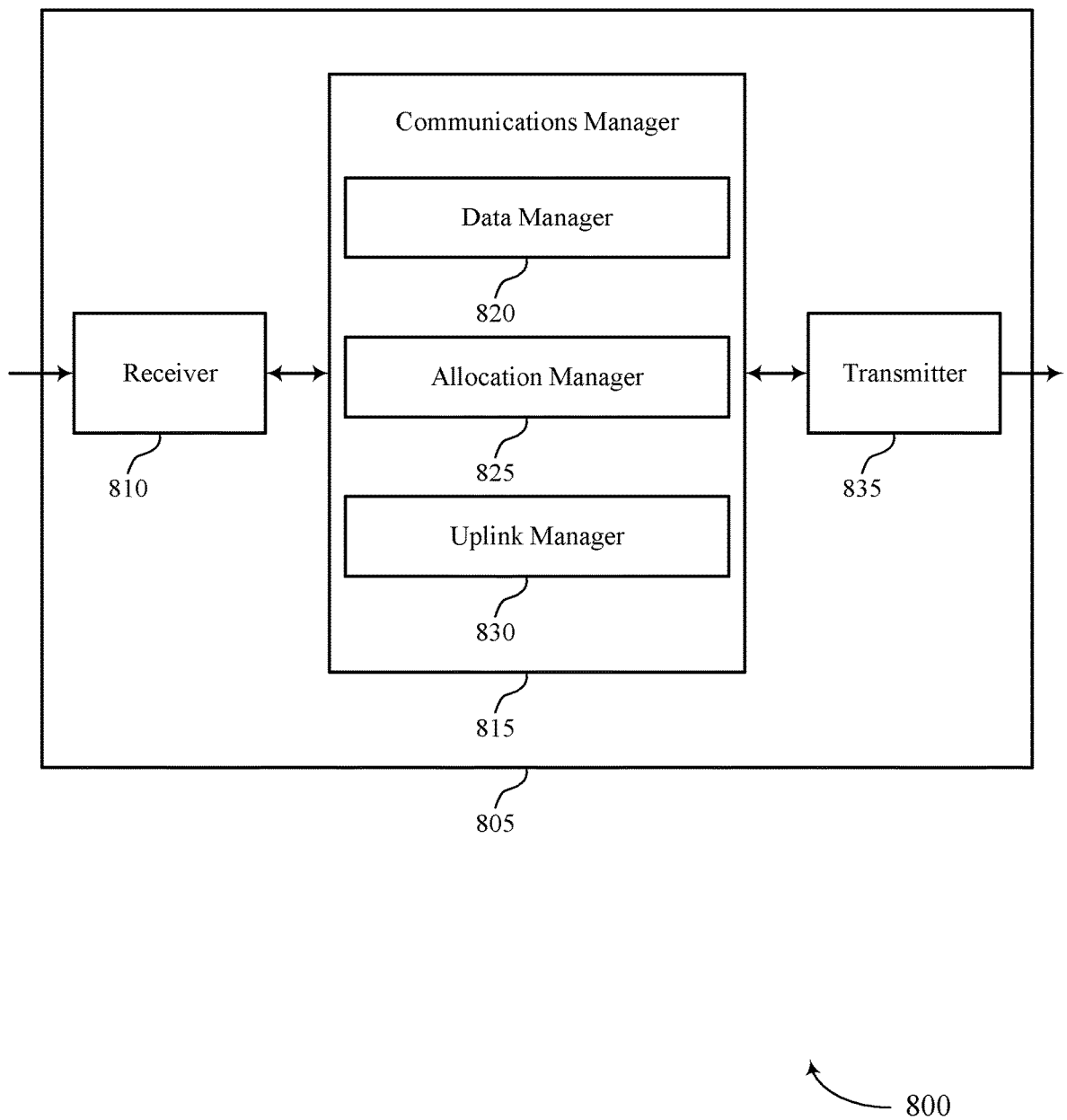

FIG. 8 shows a block diagram 800 of a device 805 that supports sequence design for noncoherent transmission with frequency and timing errors in accordance with aspects of the present disclosure. The device 805 may be an example of aspects of a device 705, or a UE 115 as described herein. The device 805 may include a receiver 810, a communications manager 815, and a transmitter 835. The device 805 may also include a processor. Each of these components may be in communication with one another (e.g., via one or more buses).

The receiver 810 may receive information such as packets, user data, or control information associated with various information channels (e.g., control channels, data channels, and information related to sequence design for noncoherent transmission with frequency and timing errors, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a data manager 820, an allocation manager 825, and an uplink manager 830. The communications manager 815 may be an example of aspects of the communications manager 1010 described herein.

The data manager 820 may transmit, to a base station, one or more transmissions over a channel. The allocation manager 825 may receive, from a base station, an indication of a configuration that repeats a sequence from a set of sequences over a resource allocation, the set of sequences configured for conveying a data. The uplink manager 830 may transmit, to the base station, at least a first instance of the sequence and a second instance of the sequence based on the configuration.

The transmitter 835 may transmit signals generated by other components of the device 805. In some examples, the transmitter 835 may be collocated with a receiver 810 in a transceiver module. For example, the transmitter 835 may be an example of aspects of the transceiver 1020 described with reference to FIG. 10. The transmitter 835 may utilize a single antenna or a set of antennas.

Figure 9:
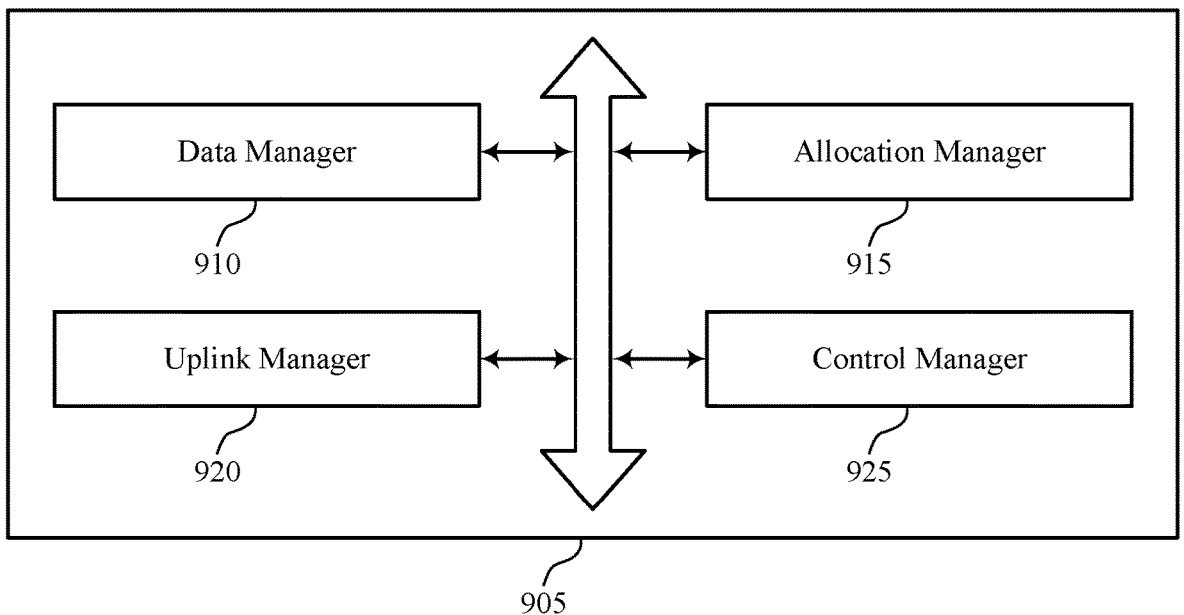
FIG. 9 shows a block diagram of a communications manager that supports sequence design for noncoherent transmission with frequency and timing errors in accordance with aspects of the present disclosure.

FIG. 9 shows a block diagram 900 of a communications manager 905 that supports sequence design for noncoherent transmission with frequency and timing errors in accordance with aspects of the present disclosure. The communications manager 905 may be an example of aspects of a communications manager 715, a communications manager 815, or a communications manager 1010 described herein. The communications manager 905 may include a data manager 910, an allocation manager 915, an uplink manager 920, and a control manager 925. Each of these modules may communicate, directly or indirectly, with one another (e.g., via one or more buses).

The data manager 910 may transmit, to a base station, one or more transmissions over a channel. In some cases, the set of sequences includes orthogonal sequences when a size of the data does not satisfy a data threshold, and where the set of sequences includes non-orthogonal sequences when the size of the data satisfies the data threshold. In some cases, a number of the set of sequences is based on a number of time periods for conveying the data and a number of frequency tones for conveying the data. In some cases, the sequence is based on a mapping between the set of sequences and a set of data values corresponding, respectively, to a set of bits of the data.

The allocation manager 915 may receive, from a base station, an indication of a configuration that repeats a sequence from a set of sequences over a resource allocation, the set of sequences configured for conveying a data. In some examples, determining, based on the indication of the configuration, that the configuration includes repeating the sequence in a time domain, where transmitting at least the first instance of the sequence and the second instance of the sequence is based on the repeating of the sequence in the time domain.

The allocation manager 915 may determine, based on the indication of the configuration, that the configuration includes repeating the sequence in a frequency domain, where transmitting at least the first instance of the sequence and the second instance of the sequence is based on the repeating of the sequence in the frequency domain.

The allocation manager 915 may determine, based on the indication of the configuration, that the configuration includes repeating the sequence in a time domain and a frequency domain, where transmitting at least the first instance of the sequence and the second instance of the sequence is based on the repeating of the sequence in the time domain and in the frequency domain.

The uplink manager 920 may transmit, to the base station, at least a first instance of the sequence and a second instance of the sequence based on the configuration. The control manager 925 may receive the indication of the configuration includes receiving the indication of the configuration via a radio resource control message, or a media access control control element message, or a downlink control information, or any combination thereof.

In some examples, the control manager 925 may receive, from the base station, an indication of a second configuration that repeats at least one sequence of the set of sequences over a second resource allocation, where transmitting the indication of the configuration and the indication of the second configuration are transmitted via the radio resource control message, where the second configuration differs from the configuration.

In some cases, the first instance of the sequence is spread over a first subset of the resource allocation in the time domain and the second instance of the sequence is spread over a second subset of the resource allocation in the time domain. In some cases, the first instance of the sequence is spread over a first subset of the resource allocation in the frequency domain and the second instance of the sequence is spread over a second subset of the resource allocation in the frequency domain.

In some cases, the first instance of the sequence is spread over a first subset of the resource allocation in the time domain and the frequency domain, the second instance of the sequence is spread over a second subset of the resource allocation in the time domain and the frequency domain, a third instance of the sequence is spread over a third subset of the resource allocation in the time domain and the frequency domain, and a fourth instance of the sequence is spread over a fourth subset of the resource allocation in the time domain and the frequency domain.

Figure 10:
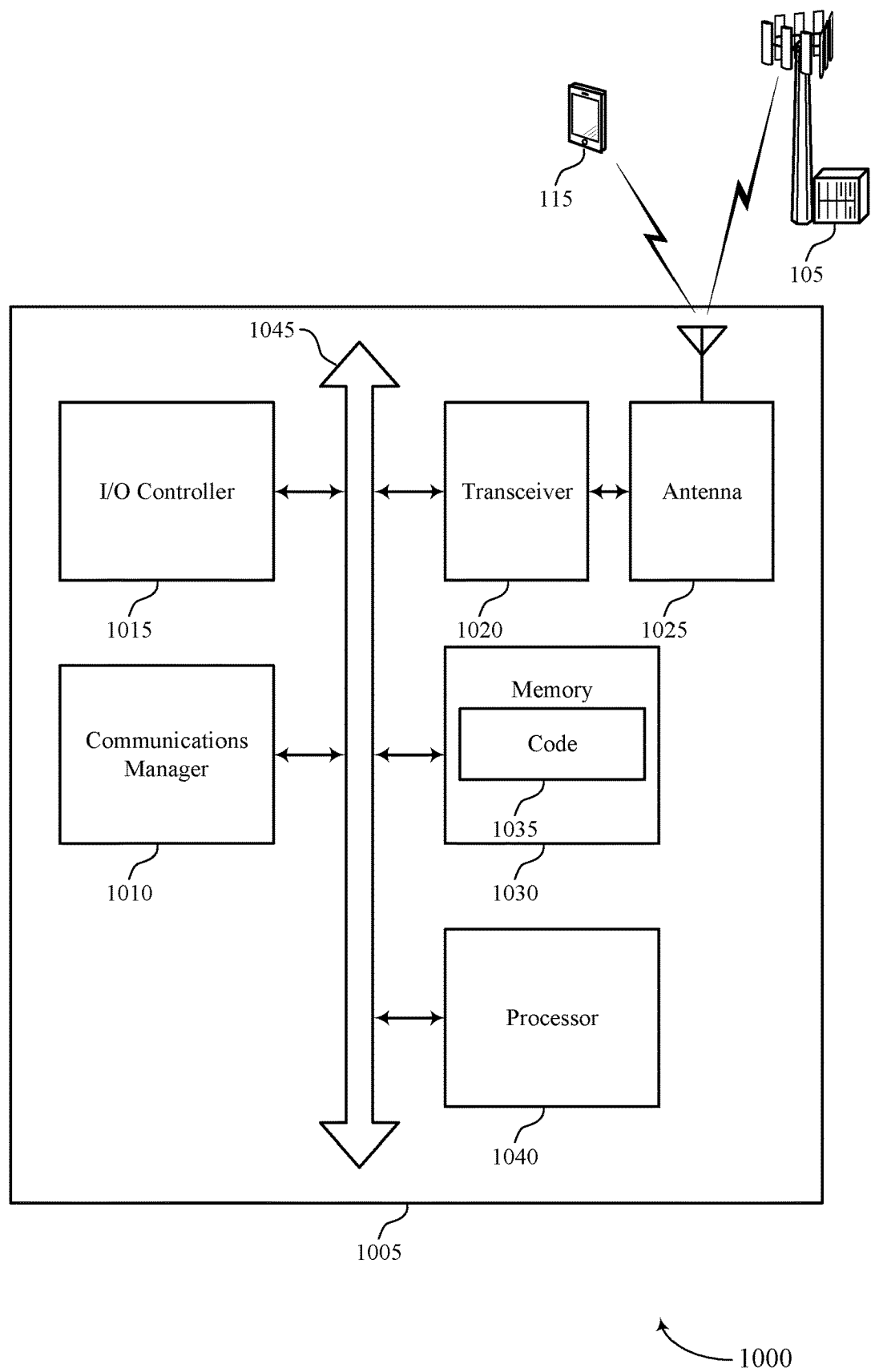
FIG. 10 shows a diagram of a system including a device that supports sequence design for noncoherent transmission with frequency and timing errors in accordance with aspects of the present disclosure.

FIG. 10 shows a diagram of a system 1000 including a device 1005 that supports sequence design for noncoherent transmission with frequency and timing errors in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may transmit, to a base station, one or more transmissions over a channel, receive, from a base station, an indication of a configuration that repeats a sequence from a set of sequences over a resource allocation, the set of sequences configured for conveying a data, and transmit, to the base station, at least a first instance of the sequence and a second instance of the sequence based on the configuration.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described herein. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include RAM and ROM. The memory 1030 may store computer-readable, computer-executable code 1035 including instructions that, when executed, cause the processor to perform various functions described herein. In some cases, the memory 1030 may contain, among other things, a BIOS which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting sequence design for noncoherent transmission with frequency and timing errors).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
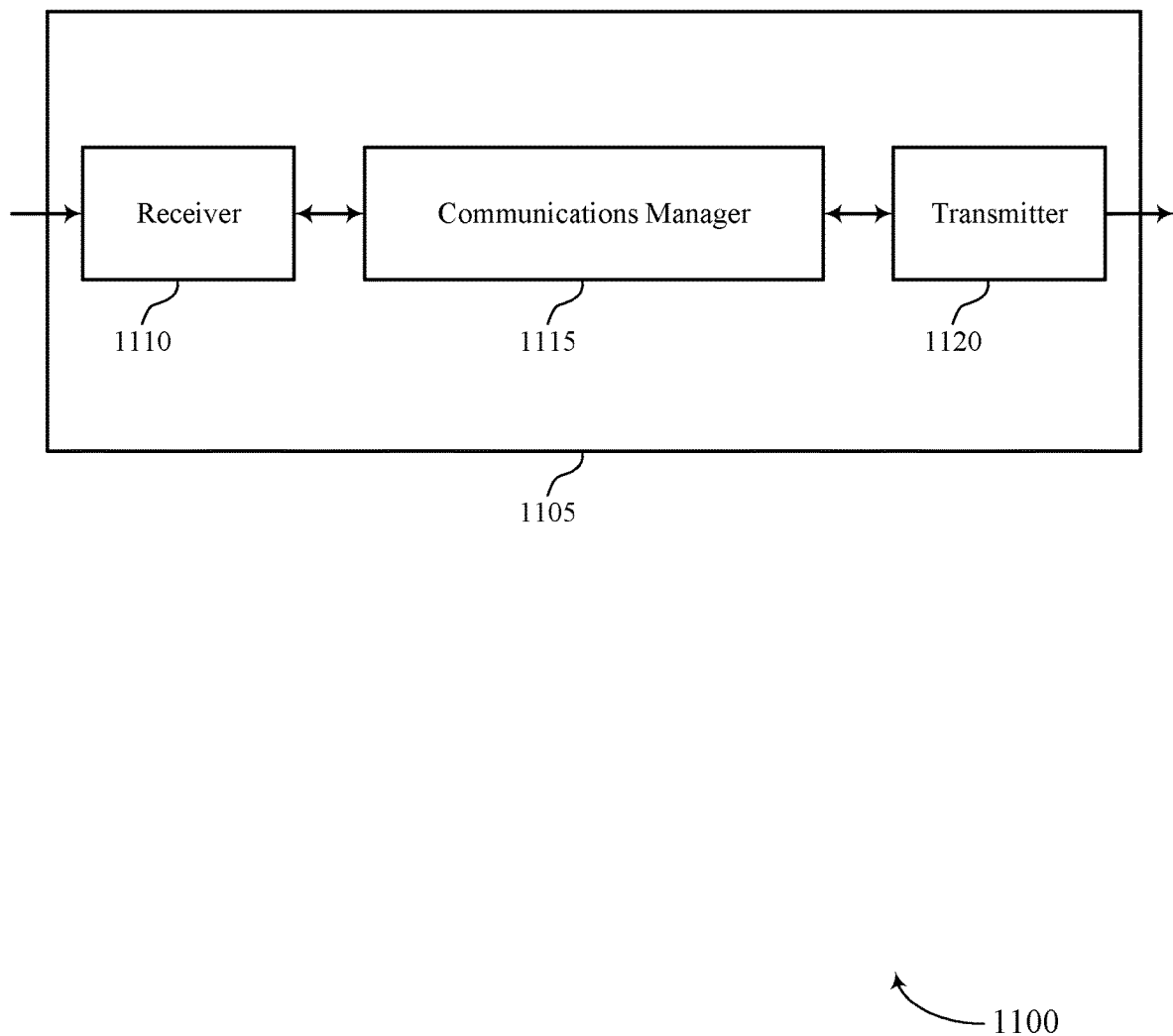
FIGS. 11 and 12 show block diagrams of devices that support sequence design for noncoherent transmission with frequency and timing errors in accordance with aspects of the present disclosure.

FIG. 11 shows a block diagram 1100 of a device 1105 that supports sequence design for noncoherent transmission with frequency and timing errors in accordance with aspects of the present disclosure. The device 1105 may be an example of aspects of a base station 105 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to sequence design for noncoherent transmission with frequency and timing errors, etc.). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may determine, based on one or more transmissions received over a channel and a channel condition of the channel, a configuration for repeating a sequence from a set of sequences over a resource allocation, the set of sequences configured for conveying data. The communications manager 1115 may transmit, to the UE, an indication of the configuration that repeats the sequence over the resource allocation. The communications manager 1115 may receive, from the UE, a first instance of the sequence and a second instance of the sequence based on the configuration. The communications manager 1115 may perform error correction on the data based on the first instance of the sequence and the second instance of the sequence. The communications manager 1115 may be an example of aspects of the communications manager 1410 described herein.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an application-specific integrated circuit (ASIC), an FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
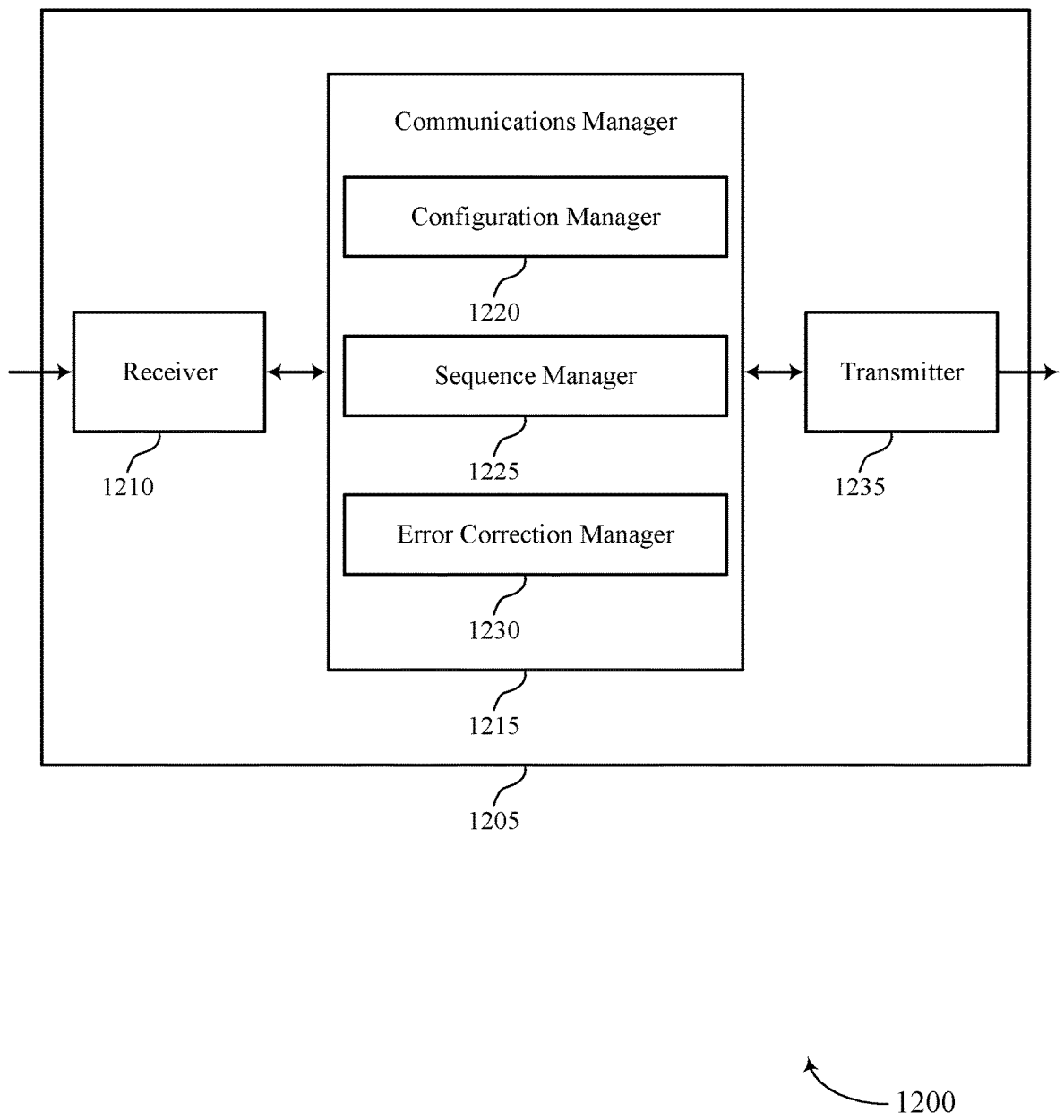

FIG. 12 shows a block diagram 1200 of a device 1205 that supports sequence design for noncoherent transmission with frequency and timing errors in accordance with aspects of the present disclosure. The device 1205 may be an example of aspects of a device 1105, or a base station 105 as described herein. The device 1205 may include a receiver 1210, a communications manager 1215, and a transmitter 1235. The device 1205 may also include a processor. Each of these components may be in communication with one another (e.g., via one or more buses).

The receiver 1210 may receive information such as packets, user data, or control information associated with various information channels (e.g., control channels, data channels, and information related to sequence design for noncoherent transmission with frequency and timing errors, etc.). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include a configuration manager 1220, a sequence manager 1225, and an error correction manager 1230. The communications manager 1215 may be an example of aspects of the communications manager 1410 described herein.

The configuration manager 1220 may determine, based on one or more transmissions received over a channel and a channel condition of the channel, a configuration for repeating a sequence from a set of sequences over a resource allocation, the set of sequences configured for conveying data and transmit, to the UE, an indication of the configuration that repeats the sequence over the resource allocation. The sequence manager 1225 may receive, from the UE, a first instance of the sequence and a second instance of the sequence based on the configuration. The error correction manager 1230 may perform error correction on the data based on the first instance of the sequence and the second instance of the sequence.

The transmitter 1235 may transmit signals generated by other components of the device 1205. In some examples, the transmitter 1235 may be collocated with a receiver 1210 in a transceiver module. For example, the transmitter 1235 may be an example of aspects of the transceiver 1420 described with reference to FIG. 14. The transmitter 1235 may utilize a single antenna or a set of antennas.

Figure 13:
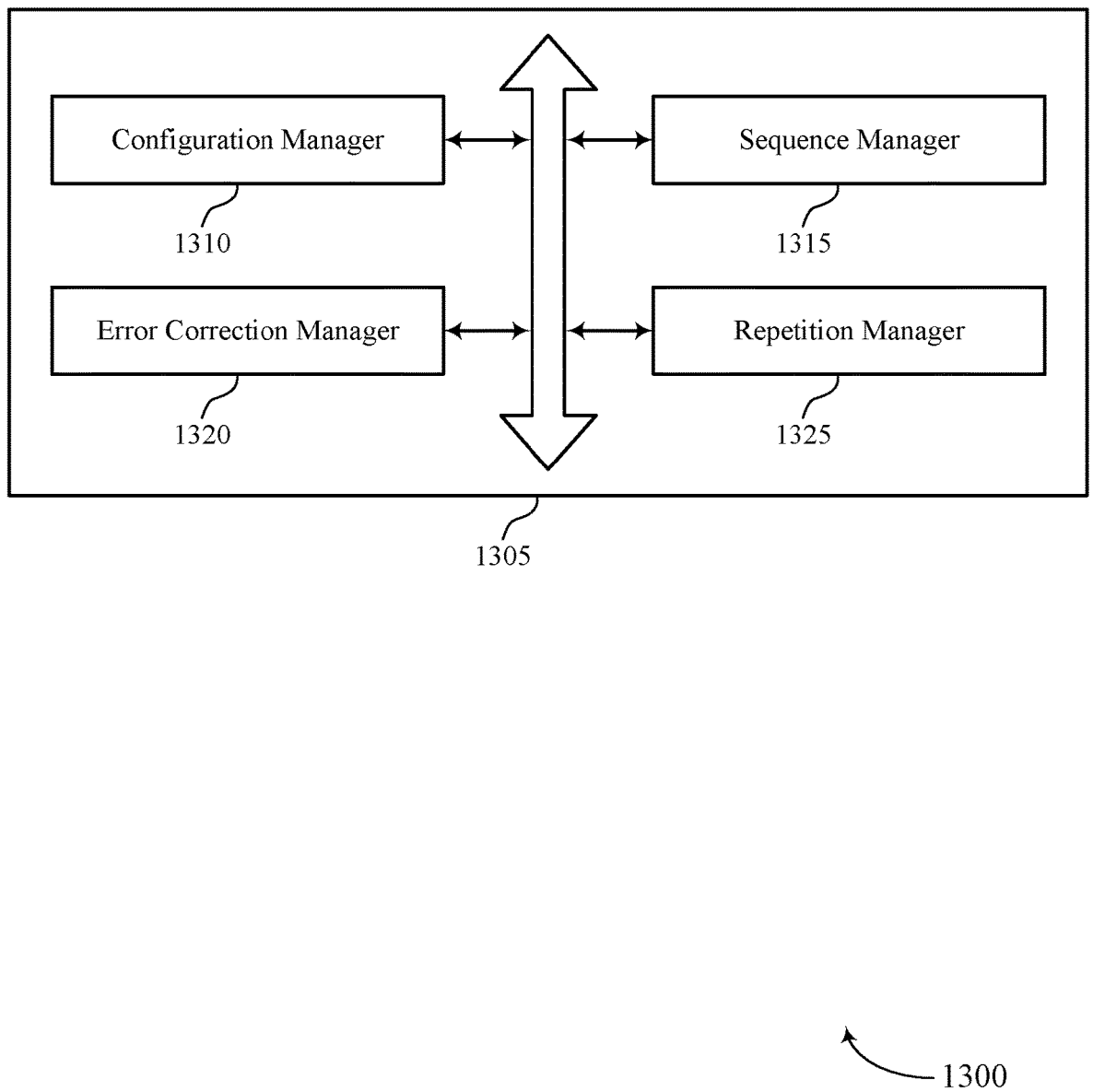
FIG. 13 shows a block diagram of a communications manager that supports sequence design for noncoherent transmission with frequency and timing errors in accordance with aspects of the present disclosure.

FIG. 13 shows a block diagram 1300 of a communications manager 1305 that supports sequence design for noncoherent transmission with frequency and timing errors in accordance with aspects of the present disclosure. The communications manager 1305 may be an example of aspects of a communications manager 1115, a communications manager 1215, or a communications manager 1410 described herein. The communications manager 1305 may include a configuration manager 1310, a sequence manager 1315, an error correction manager 1320, and a repetition manager 1325.

Each of these modules may communicate, directly or indirectly, with one another (e.g., via one or more buses).

The configuration manager 1310 may determine, based on one or more transmissions received over a channel and a channel condition of the channel, a configuration for repeating a sequence from a set of sequences over a resource allocation, the set of sequences configured for conveying data. In some examples, the configuration manager 1310 may transmit, to the UE, an indication of the configuration that repeats the sequence over the resource allocation. In some examples, the configuration manager 1310 may transmit, to the UE, the configuration that repeats the sequence over the resource allocation via a radio resource control message, or a media access control control element message, or a downlink control information, or any combination thereof.

In some examples, the configuration manager 1310 may determine a second configuration for a second resource allocation for second data. In some examples, the configuration manager 1310 may transmit, to the UE, an indication of the second configuration that repeats at least one sequence of the set of sequences over the second resource allocation, where transmitting the indication of the configuration and the indication of the second configuration are transmitted via the radio resource control message, where the second configuration differs from the configuration.

In some examples, the configuration manager 1310 may determine the configuration to repeat the sequence in the time domain and the frequency domain is based on a Kronecker product associated with a discrete Fourier transform matrix having a number of time periods in the resource allocation and a length of a cyclically shifted base sequence having a number of frequency tones in the resource allocation. The sequence manager 1315 may receive, from the UE, a first instance of the sequence and a second instance of the sequence based on the configuration.

The error correction manager 1320 may perform error correction on the data based on the first instance of the sequence and the second instance of the sequence. In some examples, the error correction manager 1320 may perform the error correction for a set of resource allocations that include the resource allocation when the configuration is signaled via the media access control control element message, or the downlink control information, or both. In some examples, the error correction manager 1320 may determine (e.g., calculate) a phase difference between a first OFDM symbol associated with the first instance of the sequence and a second OFDM symbol associated with the second instance of the sequence.

In some examples, the error correction manager 1320 may correct a phase shift associated with the data based on the phase difference. The repetition manager 1325 may determine the configuration to repeat the sequence in a time domain, and where performing the error correction includes. In some examples, the repetition manager 1325 may perform frequency error correction on the data based on the sequence being repeated in the time domain.

In some examples, the error correction manager 1320 may determine that the one or more transmissions from the UE are associated with a frequency error, where determining the configuration includes determining the configuration to repeat the sequence in the time domain based at least in part on the one or more transmissions from the UE being associated with the frequency error. In some examples, the repetition manager 1325 may determine the configuration to repeat the sequence in the time domain is based on a Kronecker product associated with a discrete Fourier transform matrix having a number of time periods in the resource allocation and a cyclically shifted base sequence having a length corresponding to a number of frequency tones in the resource allocation.

In some examples, the error correction manager 1320 may determine the configuration to repeat the sequence in a frequency domain, and where performing the error correction includes. In some examples, the repetition manager 1325 may perform timing error correction on the data based on the sequence being repeated in the frequency domain. In some examples, determining that the one or more transmissions from the UE are associated with a timing error, where determining the configuration includes determining the configuration to repeat the sequence in the frequency domain based at least in part on the one or more transmissions from the UE being associated with the timing error.

In some examples, the repetition manager 1325 may determine the configuration to repeat the sequence in the frequency domain based on a Kronecker product associated with a discrete Fourier transform matrix having a size corresponding to a number of time periods in the resource allocation and a length of a cyclically shifted base sequence having a number of frequency tones in the resource allocation. In some examples, determining the configuration to repeat the sequence in a time domain and a frequency domain, where performing the error correction includes performing timing error correction on the data based at least in part on the sequence being repeated in the frequency domain; and performing frequency error correction on the data based at least in part on the sequence being repeated in the time domain. In some examples, the repetition manager 1325 may determine that the one or more transmissions from the UE are associated with a timing error and a frequency error, where determining the configuration includes determining the configuration to repeat the sequence in the frequency domain and the time domain based at least in part on the one or more transmissions from the UE being associated with the timing error and the frequency error.

In some cases, the first instance of the sequence is spread over a first subset of the resource allocation in the time domain and the second instance of the sequence is spread over a second subset of the resource allocation in the time domain. In some cases, the first instance of the sequence is spread over a first subset of the resource allocation in the frequency domain and the second instance of the sequence is spread over a second subset of the resource allocation in the frequency domain.

In some cases, the first instance of the sequence is spread over a first subset of the resource allocation in the time domain and the frequency domain, the second instance of the sequence is spread over a second subset of the resource allocation in the time domain and the frequency domain, a third instance of the sequence is spread over a third subset of the resource allocation in the time domain and the frequency domain, and a fourth instance of the sequence is spread over a fourth subset of the resource allocation in the time domain and the frequency domain.

In some cases, the set of sequences includes orthogonal sequences when a size of the data does not satisfy a data threshold, and where the set of sequences includes non-orthogonal sequences when the size of the data satisfies the data threshold. In some cases, a number of the set of sequences is based on a number of time periods for conveying the data and a number of frequency tones for conveying the data. In some cases, the sequence is based on a mapping between the set of sequences and a set of data values corresponding, respectively, to a set of bits of the data.

Figure 14:
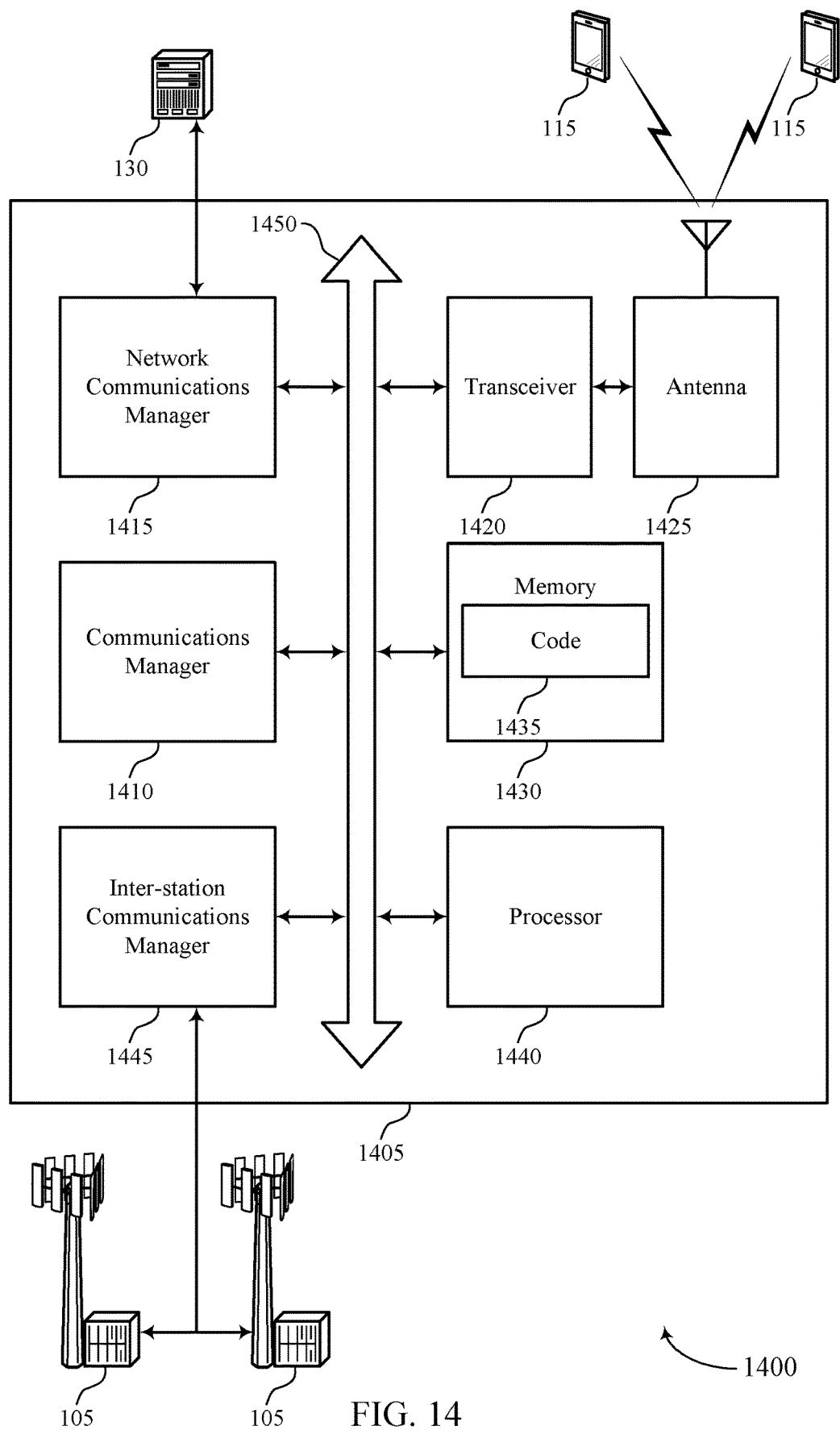
FIG. 14 shows a diagram of a system including a device that supports sequence design for noncoherent transmission with frequency and timing errors in accordance with aspects of the present disclosure.

FIG. 14 shows a diagram of a system 1400 including a device 1405 that supports sequence design for noncoherent transmission with frequency and timing errors in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The communications manager 1410 may determine, based on one or more transmissions received over a channel and a channel condition of the channel, a configuration for repeating a sequence from a set of sequences over a resource allocation, the set of sequences configured for conveying data. The communications manager 1410 may transmit, to the UE, an indication of the configuration that repeats the sequence over the resource allocation. The communications manager 1410 may receive, from the UE, a first instance of the sequence and a second instance of the sequence based on the configuration. The communications manager 1410 may perform error correction on the data based on the first instance of the sequence and the second instance of the sequence.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described herein. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting sequence design for noncoherent transmission with frequency and timing errors).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
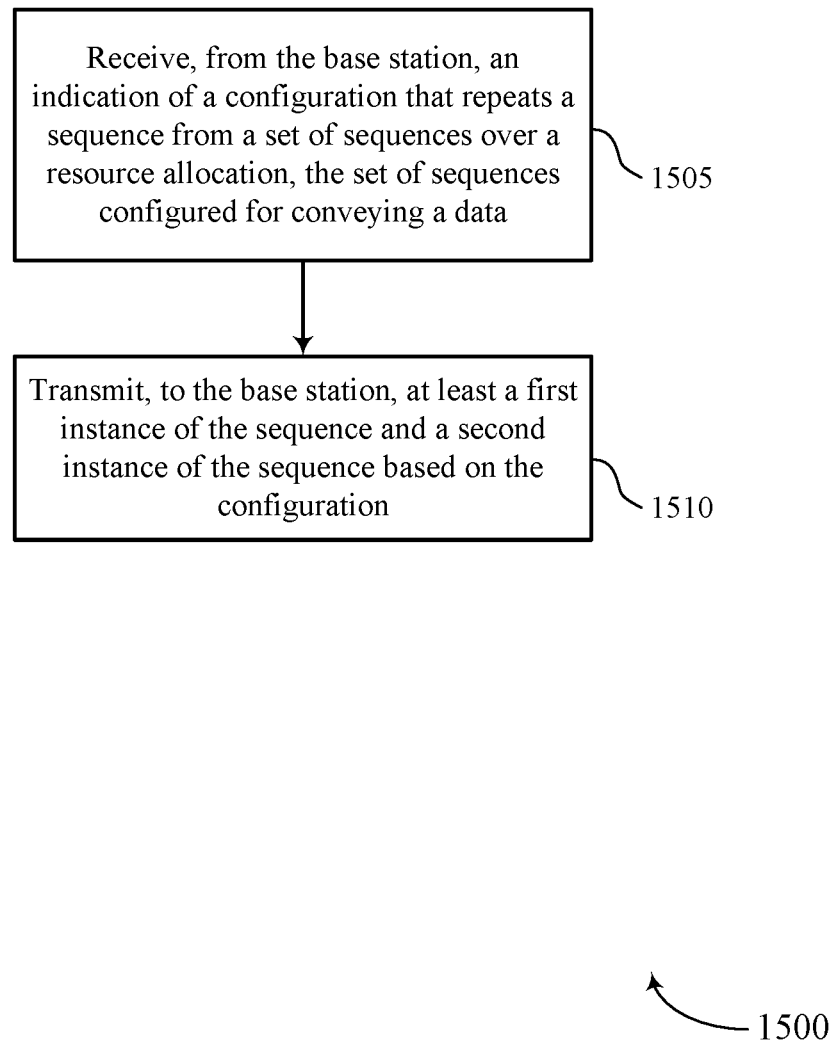
FIGS. 15 through 18 show flowcharts illustrating methods that support sequence design for noncoherent transmission with frequency and timing errors in accordance with aspects of the present disclosure.

FIG. 15 shows a flowchart illustrating a method 1500 that supports sequence design for noncoherent transmission with frequency and timing errors in accordance with aspects of the present disclosure. The operations of method 1500 may be implemented by a UE 115 or its components as described herein. For example, the operations of method 1500 may be performed by a communications manager as described with reference to FIGS. 7 through 10. In some examples, a UE may execute a set of instructions to control the functional elements of the UE to perform the functions described herein. Additionally or alternatively, a UE may perform aspects of the functions described herein using special-purpose hardware.

At 1505, the UE may receive, from a base station, an indication of a configuration that repeats a sequence from a set of sequences over a resource allocation, the set of sequences configured for conveying a data. The operations of 1505 may be performed according to the methods described herein. In some examples, aspects of the operations of 1505 may be performed by an allocation manager as described with reference to FIGS. 7 through 10.

At 1510, the UE may transmit, to the base station, at least a first instance of the sequence and a second instance of the sequence based on the configuration. The operations of 1510 may be performed according to the methods described herein. In some examples, aspects of the operations of 1510 may be performed by an uplink manager as described with reference to FIGS. 7 through 10.

Figure 16:
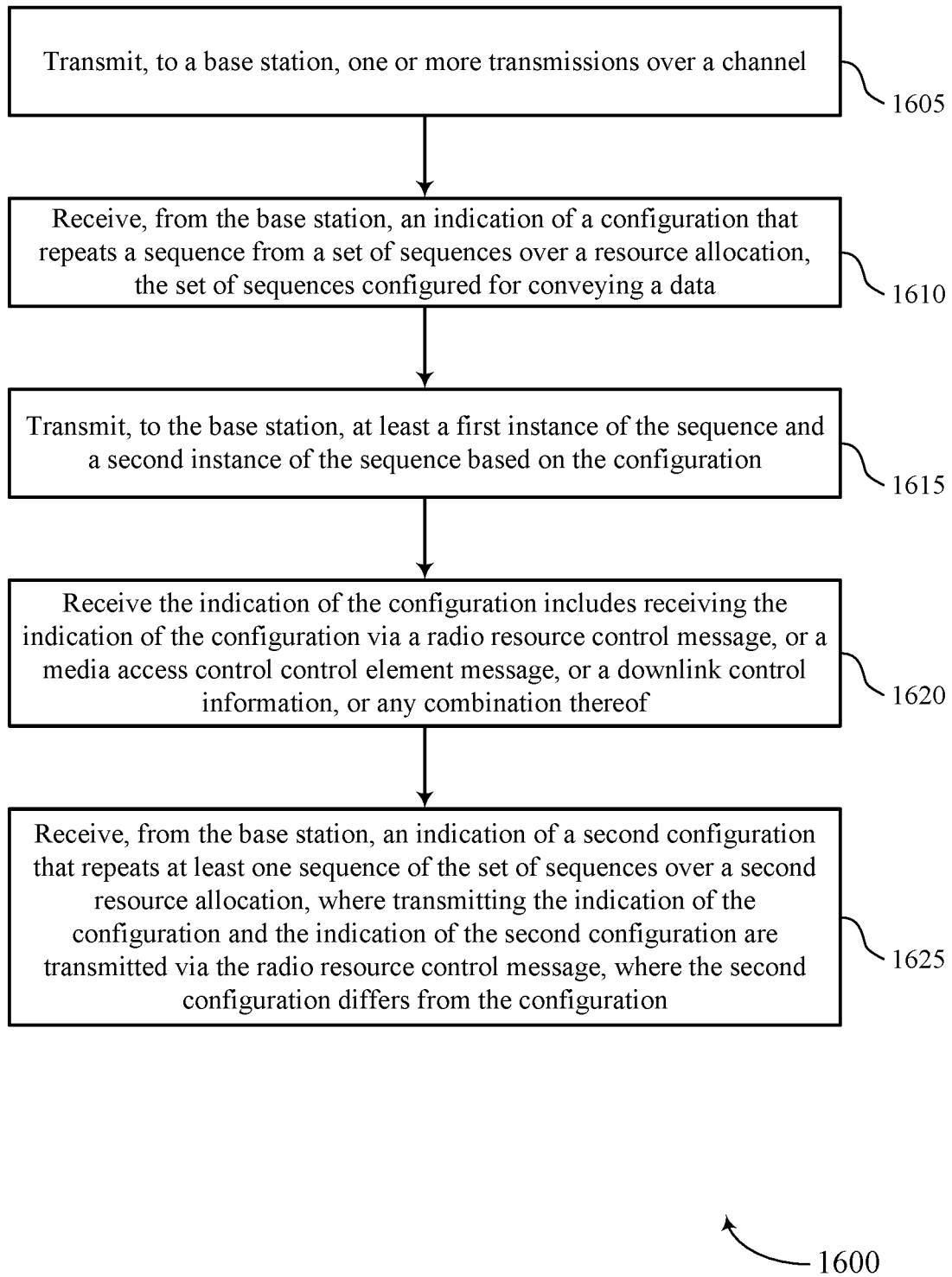

FIG. 16 shows a flowchart illustrating a method 1600 that supports sequence design for noncoherent transmission with frequency and timing errors in accordance with aspects of the present disclosure. The operations of method 1600 may be implemented by a UE 115 or its components as described herein. For example, the operations of method 1600 may be performed by a communications manager as described with reference to FIGS. 7 through 10. In some examples, a UE may execute a set of instructions to control the functional elements of the UE to perform the functions described herein. Additionally or alternatively, a UE may perform aspects of the functions described herein using special-purpose hardware.

At 1605, the UE may transmit, to a base station, one or more transmissions over a channel. The operations of 1605 may be performed according to the methods described herein. In some examples, aspects of the operations of 1605 may be performed by a data manager as described with reference to FIGS. 7 through 10.

At 1610, the UE may receive, from a base station, an indication of a configuration that repeats a sequence from a set of sequences over a resource allocation, the set of sequences configured for conveying a data. The operations of 1610 may be performed according to the methods described herein. In some examples, aspects of the operations of 1610 may be performed by an allocation manager as described with reference to FIGS. 7 through 10.

At 1615, the UE may transmit, to the base station, at least a first instance of the sequence and a second instance of the sequence based on the configuration. The operations of 1615 may be performed according to the methods described herein. In some examples, aspects of the operations of 1615 may be performed by an uplink manager as described with reference to FIGS. 7 through 10.

At 1620, the UE may receive the indication of the configuration includes receiving the indication of the configuration via a radio resource control message, or a media access control control element message, or a downlink control information, or any combination thereof. The operations of 1620 may be performed according to the methods described herein. In some examples, aspects of the operations of 1620 may be performed by a control manager as described with reference to FIGS. 7 through 10.

At 1625, the UE may receive, from the base station, an indication of a second configuration that repeats at least one sequence of the set of sequences over a second resource allocation, where transmitting the indication of the configuration and the indication of the second configuration are transmitted via the radio resource control message, where the second configuration differs from the configuration. The operations of 1625 may be performed according to the methods described herein. In some examples, aspects of the operations of 1625 may be performed by a control manager as described with reference to FIGS. 7 through 10.

Figure 17:
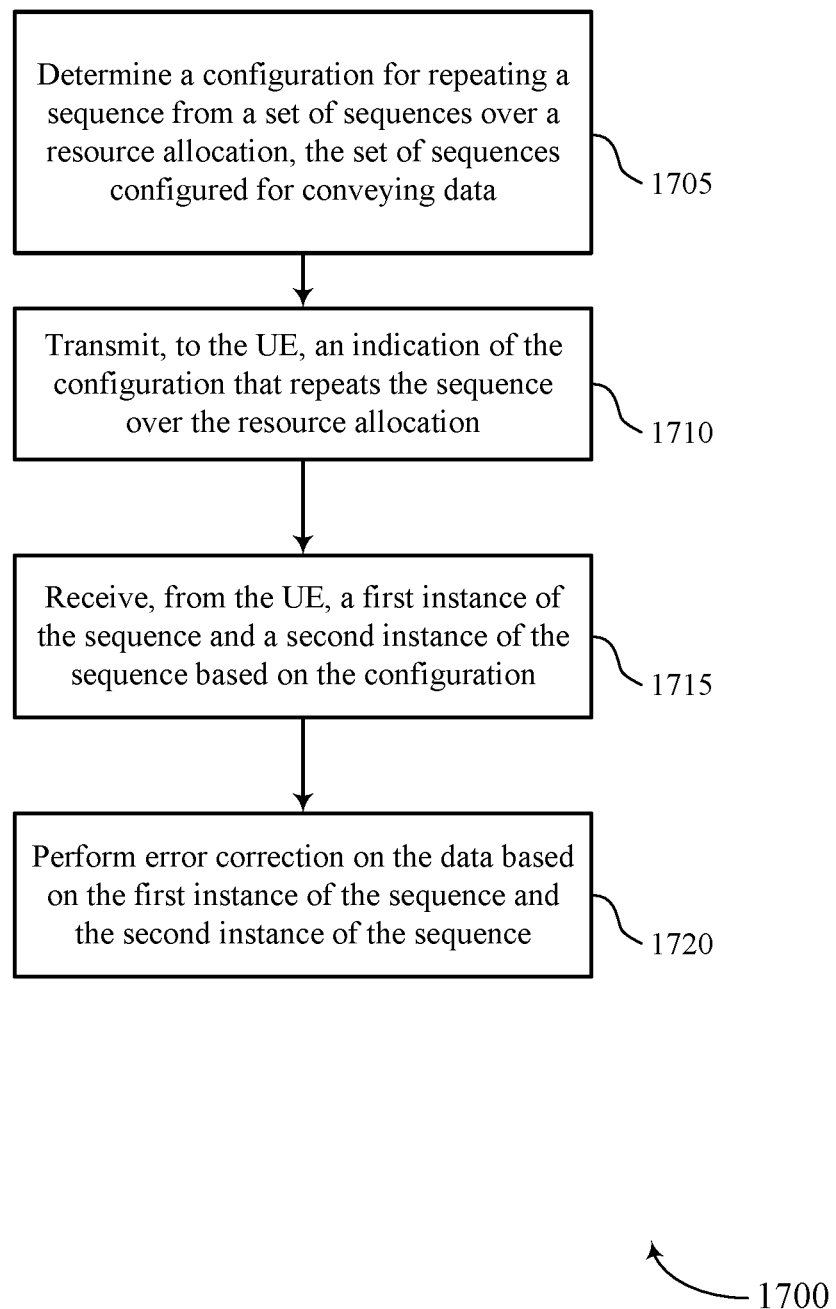

FIG. 17 shows a flowchart illustrating a method 1700 that supports sequence design for noncoherent transmission with frequency and timing errors in accordance with aspects of the present disclosure. The operations of method 1700 may be implemented by a base station 105 or its components as described herein. For example, the operations of method 1700 may be performed by a communications manager as described with reference to FIGS. 11 through 14. In some examples, a base station may execute a set of instructions to control the functional elements of the base station to perform the functions described herein. Additionally or alternatively, a base station may perform aspects of the functions described herein using special-purpose hardware.

At 1705, the base station may determine a configuration for repeating a sequence from a set of sequences over a resource allocation, the set of sequences configured for conveying data. The operations of 1705 may be performed according to the methods described herein. In some examples, aspects of the operations of 1705 may be performed by a configuration manager as described with reference to FIGS. 11 through 14.

At 1710, the base station may transmit, to the UE, an indication of the configuration that repeats the sequence over the resource allocation. The operations of 1710 may be performed according to the methods described herein. In some examples, aspects of the operations of 1710 may be performed by a configuration manager as described with reference to FIGS. 11 through 14.

At 1715, the base station may receive, from the UE, a first instance of the sequence and a second instance of the sequence based on the configuration. The operations of 1715 may be performed according to the methods described herein. In some examples, aspects of the operations of 1715 may be performed by a sequence manager as described with reference to FIGS. 11 through 14.

At 1720, the base station may perform error correction on the data based on the first instance of the sequence and the second instance of the sequence. The operations of 1720 may be performed according to the methods described herein. In some examples, aspects of the operations of 1720 may be performed by an error correction manager as described with reference to FIGS. 11 through 14.

Figure 18:
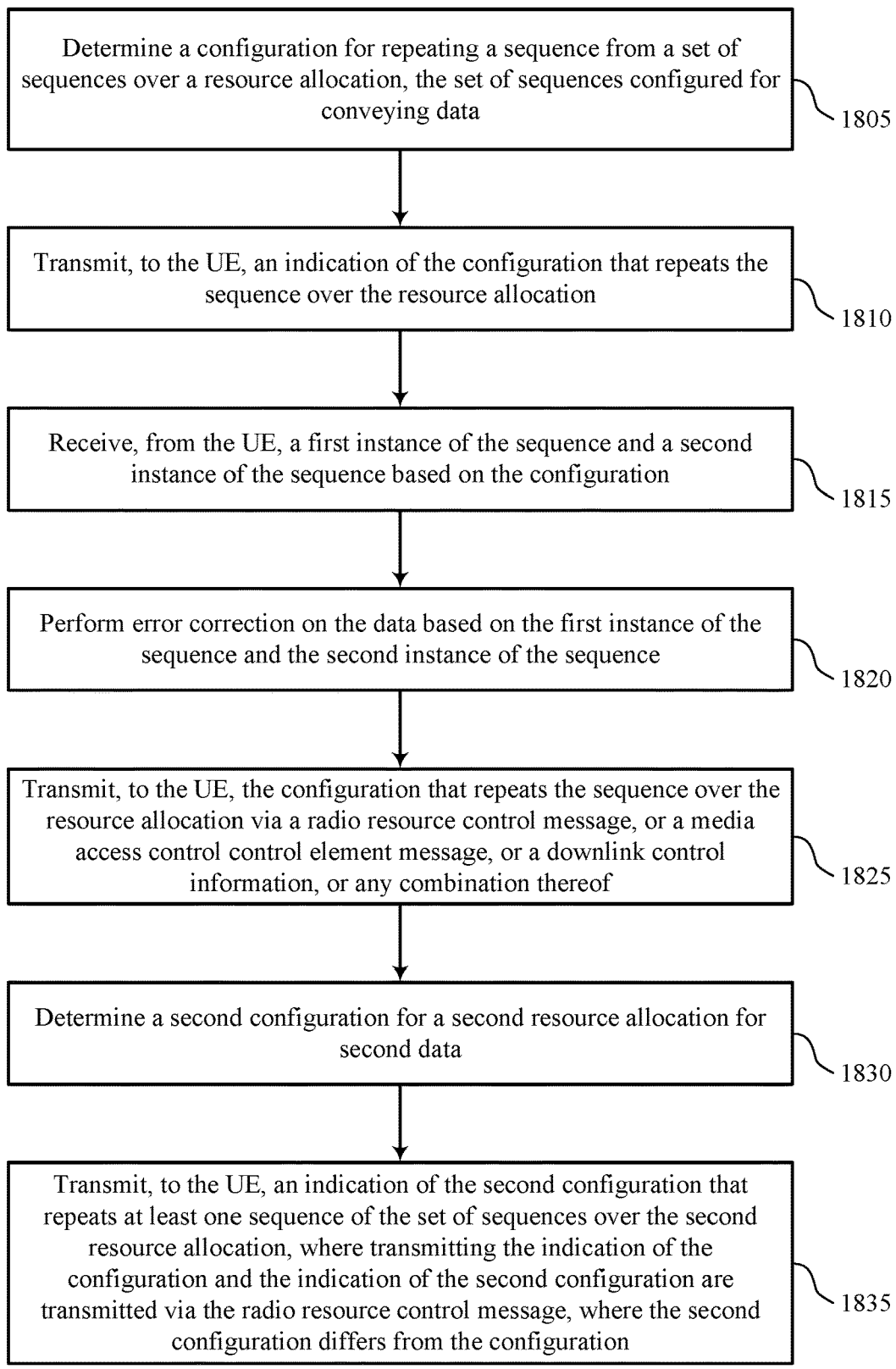

FIG. 18 shows a flowchart illustrating a method 1800 that supports sequence design for noncoherent transmission with frequency and timing errors in accordance with aspects of the present disclosure. The operations of method 1800 may be implemented by a base station 105 or its components as described herein. For example, the operations of method 1800 may be performed by a communications manager as described with reference to FIGS. 11 through 14. In some examples, a base station may execute a set of instructions to control the functional elements of the base station to perform the functions described herein. Additionally or alternatively, a base station may perform aspects of the functions described herein using special-purpose hardware.

At 1805, the base station may determine a configuration for repeating a sequence from a set of sequences over a resource allocation, the set of sequences configured for conveying data. The operations of 1805 may be performed according to the methods described herein. In some examples, aspects of the operations of 1805 may be performed by a configuration manager as described with reference to FIGS. 11 through 14.

At 1810, the base station may transmit, to the UE, an indication of the configuration that repeats the sequence over the resource allocation. The operations of 1810 may be performed according to the methods described herein. In some examples, aspects of the operations of 1810 may be performed by a configuration manager as described with reference to FIGS. 11 through 14.

At 1815, the base station may receive, from the UE, a first instance of the sequence and a second instance of the sequence based on the configuration. The operations of 1815 may be performed according to the methods described herein. In some examples, aspects of the operations of 1815 may be performed by a sequence manager as described with reference to FIGS. 11 through 14.

At 1820, the base station may perform error correction on the data based on the first instance of the sequence and the second instance of the sequence. The operations of 1820 may be performed according to the methods described herein. In some examples, aspects of the operations of 1820 may be performed by an error correction manager as described with reference to FIGS. 11 through 14.

At 1825, the base station may transmit, to the UE, the configuration that repeats the sequence over the resource allocation via a radio resource control message, or a media access control control element message, or a downlink control information, or any combination thereof. The operations of 1825 may be performed according to the methods described herein. In some examples, aspects of the operations of 1825 may be performed by a configuration manager as described with reference to FIGS. 11 through 14.

At 1830, the base station may determine a second configuration for a second resource allocation for second data. The operations of 1830 may be performed according to the methods described herein. In some examples, aspects of the operations of 1830 may be performed by a configuration manager as described with reference to FIGS. 11 through 14.

At 1835, the base station may transmit, to the UE, an indication of the second configuration that repeats at least one sequence of the set of sequences over the second resource allocation, where transmitting the indication of the configuration and the indication of the second configuration are transmitted via the radio resource control message, where the second configuration differs from the configuration. The operations of 1835 may be performed according to the methods described herein. In some examples, aspects of the operations of 1835 may be performed by a configuration manager as described with reference to FIGS. 11 through 14.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communications at UE, comprising: receiving, from a base station, an indication of a configuration that repeats a sequence from a plurality of sequences over a resource allocation, the plurality of sequences configured for conveying a data; and transmitting, to the base station, at least a first instance of the sequence and a second instance of the sequence based at least in part on the configuration.

Aspect 2: The method of aspect 1, wherein receiving the indication of the configuration comprises receiving the indication of the configuration via a radio resource control message, or a media access control control element message, or a downlink control information, or any combination thereof.

Aspect 3: The method of aspect 2, further comprising: receiving, from the base station, an indication of a second configuration that repeats at least one sequence of the plurality of sequences over a second resource allocation, wherein transmitting the indication of the configuration and the indication of the second configuration comprises transmitting via the radio resource control message, wherein the second configuration differs from the configuration.

Aspect 4: The method of any of aspects 1 through 3, further comprising: determining, based at least in part on the indication of the configuration, that the configuration comprises repeating the sequence in a time domain, wherein transmitting at least the first instance of the sequence and the second instance of the sequence is based at least in part on the repeating of the sequence in the time domain.

Aspect 5: The method of aspect 4, wherein determining the configuration to repeat the sequence in the time domain is based at least in part on a Kronecker product associated with a discrete Fourier transform matrix of a size equal to half of a total number of orthogonal frequency division multiple symbols in the resource allocation and a cyclically shifted base sequence having a length corresponding to a number of frequency tones in the resource allocation.

Aspect 6: The method of any of aspects 4 through 5, wherein the first instance of the sequence is spread over a first subset of orthogonal frequency division multiple symbols of the resource allocation and the second instance of the sequence is spread over a second subset of orthogonal frequency division multiple symbols of the resource allocation.

Aspect 7: The method of any of aspects 1 through 6, further comprising: determining, based at least in part on the indication of the configuration, that the configuration comprises repeating the sequence in a frequency domain, wherein transmitting at least the first instance of the sequence and the second instance of the sequence is based at least in part on the repeating of the sequence in the frequency domain.

Aspect 8: The method of aspect 7, wherein determining the configuration to repeat the sequence in the frequency domain based at least in part on a Kronecker product associated with a discrete Fourier transform matrix having a size corresponding to a number of time periods in the resource allocation and a length of a cyclically shifted base sequence having a length equal to half of the number of frequency tones in the resource allocation.

Aspect 9: The method of any of aspects 7 through 8, wherein the first instance of the sequence is spread over a first subset of frequency tones of the resource allocation and the second instance of the sequence is spread over a second subset of frequency tones of the resource allocation.

Aspect 10: The method of any of aspects 1 through 9, further comprising: determining, based at least in part on the indication of the configuration, that the configuration comprises repeating the sequence in a time domain and a frequency domain, wherein transmitting at least the first instance of the sequence and the second instance of the sequence is based at least in part on the repeating of the sequence in the time domain and in the frequency domain.

Aspect 11: The method of aspect 10, wherein the first instance of the sequence is spread over a first subset of orthogonal frequency division multiple symbols and frequency tones of the resource allocation, the second instance of the sequence is spread over a second subset of orthogonal frequency division multiple symbols and frequency tones of the resource allocation, a third instance of the sequence is spread over a third subset of orthogonal frequency division multiple symbols and frequency tones of the resource allocation, and a fourth instance of the sequence is spread over a fourth subset of orthogonal frequency division multiple symbols and frequency tones of the resource allocation.

Aspect 12: The method of any of aspects 1 through 11, wherein the plurality of sequences comprises orthogonal sequences when a size of the data does not satisfy a data threshold, and the plurality of sequences comprises non-orthogonal sequences when the size of the data satisfies the data threshold.

Aspect 13: The method of any of aspects 1 through 12, wherein a number of the plurality of sequences is based at least in part on a number of time periods for conveying the data and a number of frequency tones for conveying the data.

Aspect 14: The method of any of aspects 1 through 13, wherein the sequence is based at least in part on a mapping between the plurality of sequences and a set of data values corresponding, respectively, to a plurality of bits of the data, and the data corresponds to uplink control information and transmitting at least the first instance of the sequence and the second instance of the sequence corresponds to transmitting at least the first instance of the sequence and the second instance of the sequence over an uplink control channel.

Aspect 15: A method for wireless communications at a base station, comprising: determining, a configuration for repeating a sequence from a plurality of sequences over a resource allocation, the plurality of sequences configured for conveying data; transmitting, to a UE, an indication of the configuration that repeats the sequence over the resource allocation; receiving, from the UE, a first instance of the sequence and a second instance of the sequence based at least in part on the configuration; and performing error correction on the data based at least in part on the first instance of the sequence and the second instance of the sequence.

Aspect 16: The method of aspect 15, further comprising: transmitting, to the UE, the configuration that repeats the sequence over the resource allocation via a radio resource control message, or a media access control control element message, or a downlink control information, or any combination thereof.

Aspect 17: The method of aspect 16, further comprising: determining a second configuration for a second resource allocation for second data; and transmitting, to the UE, an indication of the second configuration that repeats at least one sequence of the plurality of sequences over the second resource allocation, wherein transmitting the indication of the configuration and the indication of the second configuration comprises transmitting via the radio resource control message, wherein the second configuration differs from the configuration.

Aspect 18: The method of any of aspects 16 through 17, wherein performing the error correction on the data comprises: performing the error correction for a plurality of resource allocations that comprise the resource allocation when the configuration is signaled via the media access control control element message, or the downlink control information, or both.

Aspect 19: The method of any of aspects 15 through 18, wherein determining the configuration comprises: receiving one or more transmissions received over a channel; and determining the configuration based at least in part on the one or more transmissions received over the channel or a channel condition of the channel, or both.

Aspect 20: The method of any of aspects 15 through 19, wherein determining the configuration comprises: determining the configuration to repeat the sequence in a time domain, and wherein performing the error correction comprises; and performing frequency error correction on the data based at least in part on the sequence being repeated in the time domain.

Aspect 21: The method of aspect 20, further comprising: determining that the one or more transmissions from the UE are associated with a frequency error, wherein determining the configuration comprises: determining the configuration to repeat the sequence in the time domain based at least in part on the one or more transmissions from the UE being associated with the frequency error.

Aspect 22: The method of any of aspects 20 through 21, wherein determining the configuration to repeat the sequence in the time domain is based at least in part on a Kronecker product associated with a discrete Fourier transform matrix of a size equal to half of a total number of orthogonal frequency division multiple symbols in the resource allocation and a cyclically shifted base sequence having a length corresponding to a number of frequency tones in the resource allocation.

Aspect 23: The method of any of aspects 20 through 22, wherein the first instance of the sequence is spread over a first subset of the resource allocation in the time domain and the second instance of the sequence is spread over a second subset of the resource allocation in the time domain.

Aspect 24: The method of any of aspects 15 through 23, wherein determining the configuration comprises: determining the configuration to repeat the sequence in a frequency domain, and wherein performing the error correction comprises: performing timing error correction on the data based at least in part on the sequence being repeated in the frequency domain.

Aspect 25: The method of aspect 24, further comprising: determining that the one or more transmissions from the UE are associated with a timing error, wherein determining the configuration comprises: determining the configuration to repeat the sequence in the frequency domain based at least in part on the one or more transmissions from the UE being associated with the timing error.

Aspect 26: The method of any of aspects 24 through 25, wherein determining the configuration to repeat the sequence in the frequency domain based at least in part on a Kronecker product associated with a discrete Fourier transform matrix having a size corresponding to a number of time periods in the resource allocation and a length of a cyclically shifted base sequence having a length equal to half of the number of frequency tones in the resource allocation.

Aspect 27: The method of any of aspects 24 through 26, wherein the first instance of the sequence is spread over a first subset of the resource allocation in the frequency domain and the second instance of the sequence is spread over a second subset of the resource allocation in the frequency domain.

Aspect 28: The method of any of aspects 15 through 27, wherein determining the configuration comprises: determining the configuration to repeat the sequence in a time domain and a frequency domain, wherein performing the error correction comprises: performing timing error correction on the data based at least in part on the sequence being repeated in the frequency domain; and performing frequency error correction on the data based at least in part on the sequence being repeated in the time domain.

Aspect 29: The method of aspect 28, further comprising: determining that the one or more transmissions from the UE are associated with a timing error and a frequency error, wherein determining the configuration comprises; and determining the configuration to repeat the sequence in the frequency domain and the time domain based at least in part on the one or more transmissions from the UE being associated with the timing error and the frequency error.

Aspect 30: The method of any of aspects 28 through 29, wherein determining the configuration to repeat the sequence in the time domain and the frequency domain is based at least in part on a Kronecker product associated with a discrete Fourier transform matrix having a number of time periods in the resource allocation and a length of a cyclically shifted base sequence having a number of frequency tones in the resource allocation.

Aspect 31: The method of any of aspects 28 through 30, wherein the first instance of the sequence is spread over a first subset of the resource allocation in the time domain and the frequency domain, the second instance of the sequence is spread over a second subset of the resource allocation in the time domain and the frequency domain, a third instance of the sequence is spread over a third subset of the resource allocation in the time domain and the frequency domain, and a fourth instance of the sequence is spread over a fourth subset of the resource allocation in the time domain and the frequency domain.

Aspect 32: The method of any of aspects 15 through 31, wherein performing the error correction on the data comprises: calculating a phase difference between a first OFDM symbol associated with the first instance of the sequence and a second OFDM symbol associated with the second instance of the sequence; and correcting a phase shift associated with the data based at least in part on the phase difference.

Aspect 33: The method of any of aspects 15 through 32, wherein the plurality of sequences comprises orthogonal sequences when a size of the data does not satisfy a data threshold, and the plurality of sequences comprises non-orthogonal sequences when the size of the data satisfies the data threshold.

Aspect 34: The method of any of aspects 15 through 33, wherein a number of the plurality of sequences is based at least in part on a number of time periods for conveying the data and a number of frequency tones for conveying the data.

Aspect 35: The method of any of aspects 15 through 34, wherein the sequence is based at least in part on a mapping between the plurality of sequences and a set of data values corresponding, respectively, to a plurality of bits of the data.

Aspect 36: An apparatus for wireless communications at UE, comprising a processor; memory coupled with the processor; and instructions stored in the memory and executable by the processor to cause the apparatus to perform a method of any of aspects 1 through 14.

Aspect 37: An apparatus for wireless communications at UE, comprising at least one means for performing a method of any of aspects 1 through 14.

Aspect 38: A non-transitory computer-readable medium storing code for wireless communications at UE, the code comprising instructions executable by a processor to perform a method of any of aspects 1 through 14.

Aspect 39: An apparatus for wireless communications at a base station, comprising a processor; memory coupled with the processor; and instructions stored in the memory and executable by the processor to cause the apparatus to perform a method of any of aspects 15 through 35.

Aspect 40: An apparatus for wireless communications at a base station, comprising at least one means for performing a method of any of aspects 15 through 35.

Aspect 41: A non-transitory computer-readable medium storing code for wireless communications at a base station, the code comprising instructions executable by a processor to perform a method of any of aspects 15 through 35.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at user equipment (UE), comprising:
   receiving, from a base station, an indication of a configuration that repeats a sequence from a plurality of sequences over a resource allocation, the plurality of sequences configured for conveying a data; and
   transmitting, to the base station, at least a first instance of the sequence and a second instance of the sequence based at least in part on the configuration;
   wherein the plurality of sequences comprises orthogonal sequences when a size of the data does not satisfy a data threshold, and wherein the plurality of sequences comprises non-orthogonal sequences when the size of the data satisfies the data threshold.

2. The method of claim 1, wherein:
   receiving the indication of the configuration comprises receiving the indication of the configuration via a radio resource control message, or a media access control control element message, or a downlink control information, or any combination thereof.

3. The method of claim 2, further comprising:
   receiving, from the base station, an indication of a second configuration that repeats at least one sequence of the plurality of sequences over a second resource allocation, wherein transmitting the indication of the configuration and the indication of the second configuration comprises transmitting via the radio resource control message, wherein the second configuration differs from the configuration.

4. The method of claim 1, further comprising:
   determining, based at least in part on the indication of the configuration, that the configuration comprises repeating the sequence in a time domain, wherein transmitting at least the first instance of the sequence and the second instance of the sequence is based at least in part on the repeating of the sequence in the time domain.

5. The method of claim 4, wherein determining the configuration to repeat the sequence in the time domain is based at least in part on a Kronecker product associated with a discrete Fourier transform matrix of a size equal to half of a total number of orthogonal frequency division multiple symbols in the resource allocation and a cyclically shifted base sequence having a length corresponding to a number of frequency tones in the resource allocation.

6. The method of claim 4, wherein the first instance of the sequence is spread over a first subset of orthogonal frequency division multiple symbols of the resource allocation and the second instance of the sequence is spread over a second subset of orthogonal frequency division multiple symbols of the resource allocation.

7. The method of claim 1, further comprising:
   determining, based at least in part on the indication of the configuration, that the configuration comprises repeating the sequence in a frequency domain, wherein transmitting at least the first instance of the sequence and the second instance of the sequence is based at least in part on the repeating of the sequence in the frequency domain.

8. The method of claim 7, wherein:
   determining the configuration to repeat the sequence in the frequency domain based at least in part on a Kronecker product associated with a discrete Fourier transform matrix having a size corresponding to a number of time periods in the resource allocation and a length of a cyclically shifted base sequence having a length equal to half of the number of frequency tones in the resource allocation.

9. The method of claim 7, wherein the first instance of the sequence is spread over a first subset of frequency tones of the resource allocation and the second instance of the sequence is spread over a second subset of frequency tones of the resource allocation.

10. The method of claim 1, further comprising:
    determining, based at least in part on the indication of the configuration, that the configuration comprises repeating the sequence in a time domain and a frequency domain, wherein transmitting at least the first instance of the sequence and the second instance of the sequence is based at least in part on the repeating of the sequence in the time domain and in the frequency domain.

11. The method of claim 10, wherein the first instance of the sequence is spread over a first subset of orthogonal frequency division multiple symbols and frequency tones of the resource allocation, the second instance of the sequence is spread over a second subset of orthogonal frequency division multiple symbols and frequency tones of the resource allocation, a third instance of the sequence is spread over a third subset of orthogonal frequency division multiple symbols and frequency tones of the resource allocation, and a fourth instance of the sequence is spread over a fourth subset of orthogonal frequency division multiple symbols and frequency tones of the resource allocation.

12. The method of claim 1, wherein a number of the plurality of sequences is based at least in part on a number of time periods for conveying the data and a number of frequency tones for conveying the data.

13. The method of claim 1, wherein the sequence is based at least in part on a mapping between the plurality of sequences and a set of data values corresponding, respectively, to a plurality of bits of the data, and wherein the data corresponds to uplink control information and transmitting at least the first instance of the sequence and the second instance of the sequence corresponds to transmitting at least the first instance of the sequence and the second instance of the sequence over an uplink control channel.

14. A method for wireless communications at a base station, comprising:
determining, a configuration for repeating a sequence from a plurality of sequences over a resource allocation, the plurality of sequences configured for conveying data;
transmitting, to a user equipment (UE), an indication of the configuration that repeats the sequence over the resource allocation;
receiving, from the UE, a first instance of the sequence and a second instance of the sequence based at least in part on the configuration; and
performing error correction on the data based at least in part on the first instance of the sequence and the second instance of the sequence;
wherein determining the configuration comprises:
receiving one or more transmissions received over a channel; and
determining the configuration based at least in part on the one or more transmissions received over the channel or a channel condition of the channel, or both.

15. The method of claim 14, further comprising:
transmitting, to the UE, the configuration that repeats the sequence over the resource allocation via a radio resource control message, or a media access control control element message, or a downlink control information, or any combination thereof.

16. The method of claim 15, further comprising:
determining a second configuration for a second resource allocation for second data; and
transmitting, to the UE, an indication of the second configuration that repeats at least one sequence of the plurality of sequences over the second resource allocation, wherein transmitting the indication of the configuration and the indication of the second configuration comprises transmitting via the radio resource control message, wherein the second configuration differs from the configuration.

17. The method of claim 15, wherein performing the error correction on the data comprises:
performing the error correction for a plurality of resource allocations that comprise the resource allocation when the configuration is signaled via the media access control control element message, or the downlink control information, or both.

18. A method for wireless communications at a base station, comprising:
determining, a configuration for repeating a sequence from a plurality of sequences over a resource allocation, the plurality of sequences configured for conveying data;
transmitting, to a user equipment (UE), an indication of the configuration that repeats the sequence over the resource allocation;
receiving, from the UE, a first instance of the sequence and a second instance of the sequence based at least in part on the configuration;
performing error correction on the data based at least in part on the first instance of the sequence and the second instance of the sequence;
determining the configuration to repeat the sequence in a time domain, and wherein performing the error correction comprises; and
performing frequency error correction on the data based at least in part on the sequence being repeated in the time domain.

19. The method of claim 18, further comprising:
determining that the one or more transmissions from the UE are associated with a frequency error, wherein determining the configuration comprises:
determining the configuration to repeat the sequence in the time domain based at least in part on the one or more transmissions from the UE being associated with the frequency error.

20. The method of claim 18, wherein determining the configuration to repeat the sequence in the time domain is based at least in part on a Kronecker product associated with a discrete Fourier transform matrix of a size equal to half of a total number of orthogonal frequency division multiple symbols in the resource allocation and a cyclically shifted base sequence having a length corresponding to a number of frequency tones in the resource allocation.

21. The method of claim 18, wherein the first instance of the sequence is spread over a first subset of the resource allocation in the time domain and the second instance of the sequence is spread over a second subset of the resource allocation in the time domain.

22. A method for wireless communications at a base station, comprising:
determining, a configuration for repeating a sequence from a plurality of sequences over a resource allocation, the plurality of sequences configured for conveying data;
transmitting, to a user equipment (UE), an indication of the configuration that repeats the sequence over the resource allocation;
receiving, from the UE, a first instance of the sequence and a second instance of the sequence based at least in part on the configuration;
performing error correction on the data based at least in part on the first instance of the sequence and the second instance of the sequence;
determining the configuration to repeat the sequence in a frequency domain, and wherein performing the error correction comprises:
performing timing error correction on the data based at least in part on the sequence being repeated in the frequency domain.

23. The method of claim 22, further comprising:
determining that the one or more transmissions from the UE are associated with a timing error, wherein determining the configuration comprises:
determining the configuration to repeat the sequence in the frequency domain based at least in part on the one or more transmissions from the UE being associated with the timing error.

24. The method of claim 22, wherein determining the configuration to repeat the sequence in the frequency domain based at least in part on a Kronecker product associated with a discrete Fourier transform matrix having a size corresponding to a number of time periods in the resource allocation and a length of a cyclically shifted base sequence having a length equal to half of the number of frequency tones in the resource allocation.

25. The method of claim 22, wherein the first instance of the sequence is spread over a first subset of the resource allocation in the frequency domain and the second instance of the sequence is spread over a second subset of the resource allocation in the frequency domain.

26. A method for wireless communications at a base station, comprising:
- determining, a configuration for repeating a sequence from a plurality of sequences over a resource allocation, the plurality of sequences configured for conveying data;
- transmitting, to a user equipment (UE), an indication of the configuration that repeats the sequence over the resource allocation;
- receiving, from the UE, a first instance of the sequence and a second instance of the sequence based at least in part on the configuration;
- performing error correction on the data based at least in part on the first instance of the sequence and the second instance of the sequence;
- determining the configuration to repeat the sequence in a time domain and a frequency domain, wherein performing the error correction comprises:
- performing timing error correction on the data based at least in part on the sequence being repeated in the frequency domain; and
- performing frequency error correction on the data based at least in part on the sequence being repeated in the time domain.

27. An apparatus for wireless communications at user equipment (UE), comprising:
- a processor,
- memory coupled with the processor; and
- instructions stored in the memory and executable by the processor to cause the apparatus to:
- receive, from a base station, an indication of a configuration that repeats a sequence from a plurality of sequences over a resource allocation, the plurality of sequences configured for conveying a data; and
- transmit, to the base station, at least a first instance of the sequence and a second instance of the sequence based at least in part on the configuration;
- wherein the plurality of sequences comprises orthogonal sequences when a size of the data does not satisfy a data threshold, and wherein the plurality of sequences comprises non-orthogonal sequences when the size of the data satisfies the data threshold.

28. An apparatus for wireless communications at a base station, comprising:
- a processor,
- memory coupled with the processor; and
- instructions stored in the memory and executable by the processor to cause the apparatus to:
- determine, a configuration for repeating a sequence from a plurality of sequences over a resource allocation, the plurality of sequences configured for conveying data;
- transmit, to the UE, an indication of the configuration that repeats the sequence over the resource allocation;
- receive, from the UE, a first instance of the sequence and a second instance of the sequence based at least in part on the configuration; and
- perform error correction on the data based at least in part on the first instance of the sequence and the second instance of the sequence;
- wherein determining the configuration comprises:
- receiving one or more transmissions received over a channel; and
- determining the configuration based at least in part on the one or more transmissions received over the channel or a channel condition of the channel, or both.

29. A method for wireless communications at a base station, comprising:
- determining, a configuration for repeating a sequence from a plurality of sequences over a resource allocation, the plurality of sequences configured for conveying data;
- transmitting, to a user equipment (UE), an indication of the configuration that repeats the sequence over the resource allocation;
- receiving, from the UE, a first instance of the sequence and a second instance of the sequence based at least in part on the configuration; and
- performing error correction on the data based at least in part on the first instance of the sequence and the second instance of the sequence;
- determining the configuration to repeat the sequence in a time domain and/or a frequency domain, wherein performing the error correction comprises:
- when determining the configuration to repeat the sequence in the frequency domain, performing timing error correction on the data based at least in part on the sequence being repeated in the frequency domain; and
- when determining the configuration to repeat the sequence in the time domain, performing frequency error correction on the data based at least in part on the sequence being repeated in the time domain.

* * * * *